United States Patent [19]

Bartholomew

[11] Patent Number: 5,782,508
[45] Date of Patent: Jul. 21, 1998

[54] SWIVELABLE QUICK CONNECTOR ASSEMBLY

[75] Inventor: Donald D. Bartholomew, Mt. Clemens, Mich.

[73] Assignee: Proprietary Technologies, Inc., Bloomfield Hills, Mich.

[21] Appl. No.: 615,847

[22] Filed: Mar. 12, 1996

Related U.S. Application Data

[60] Division of Ser. No. 437,272, May 8, 1995, which is a continuation-in-part of Ser. No. 9,009, Jan. 26, 1993, Pat. No. 5,413,387, which is a division of Ser. No. 506,449, Apr. 6, 1990, abandoned, which is a continuation of Ser. No. 360,405, Jun. 2, 1989, Pat. No. 4,936,544, which is a division of Ser. No. 251,038, Sep. 26, 1988, Pat. No. 4,915,136, which is a continuation of Ser. No. 127,532, Dec. 2, 1987, abandoned, which is a continuation of Ser. No. 748,307, Jun. 24, 1985, abandoned, which is a continuation of Ser. No. 360,201, Mar. 22, 1982, Pat. No. 4,601,497, which is a continuation-in-part of Ser. No. 201,711, Oct. 29, 1980, Pat. No. 4,423,892.

[51] Int. Cl.$^6$ ............................................. F16L 37/14
[52] U.S. Cl. ............................. 285/319; 285/308; 285/921
[58] Field of Search ............................ 285/305, 308, 285/319, 921, 275, 278, 320

[56] References Cited

U.S. PATENT DOCUMENTS 3,711,125  1/1973  Dehar .................... 285/319 X
3,724,882  4/1973  Dehar .................... 285/322 X
4,266,814  5/1981  Gallegher ................ 285/319
4,681,351  7/1987  Bartholomew.
5,257,833  11/1993  McNaughton et al..

Primary Examiner—Randolph A. Reese
Assistant Examiner—Heather Shackleford
Attorney, Agent, or Firm—Harness, Dickey & Pierce

[57] ABSTRACT

A swivelable quick connect assembly for use with tubular conduits is disclosed as comprising a housing having an axial bore for receiving one end of the conduit, an elastomeric ring-like seal disposed in the bore for providing a fluid-tight seal between confronting portions of the conduit and the housing, an annular bushing disposed in the bore for positioning the seal and for guiding the one end of the conduit into nesting relationship with the bore, and a retainer detachably secured to the housing and cooperable with an annular projection on the conduit for securing the conduit in its operative position within the bore, the retainer having resilient deformable portions which are adapted to snap over the locking wall upon insertion of the conduit into the housing bore. An alternate embodiment of the present invention includes a metal retainer element that is of one pieced construction that includes at least two circumferentially spaced leg members which extend from an integral collar member at one end thereof.

22 Claims, 11 Drawing Sheets

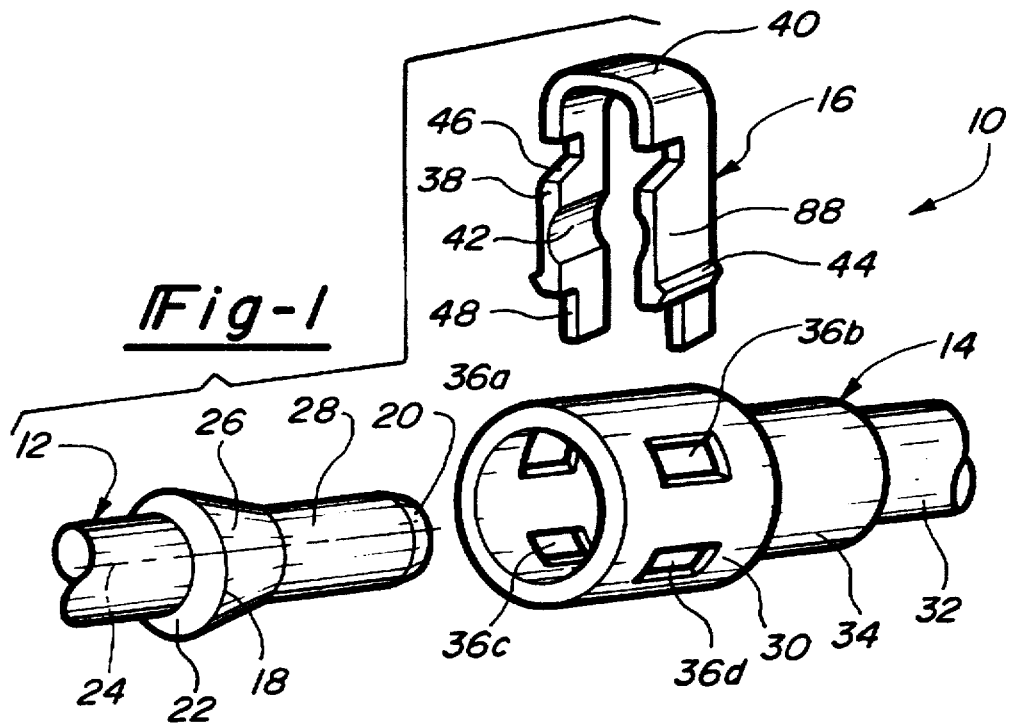
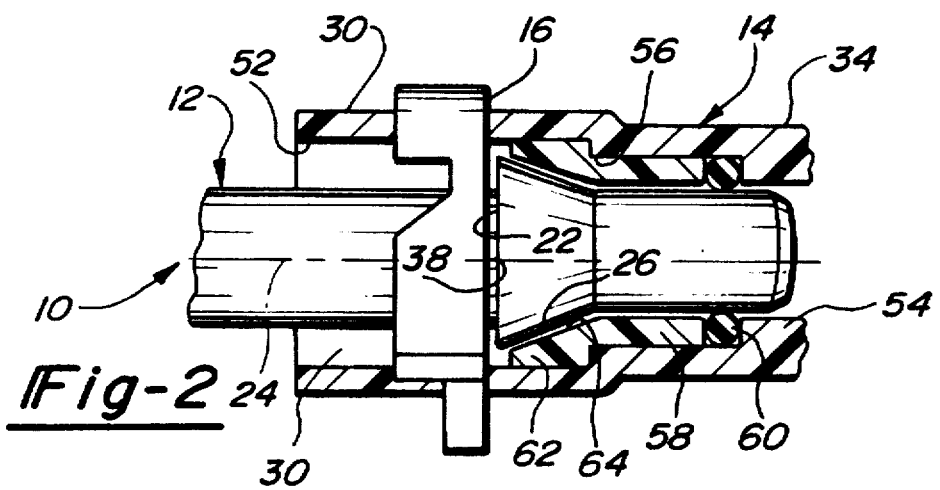
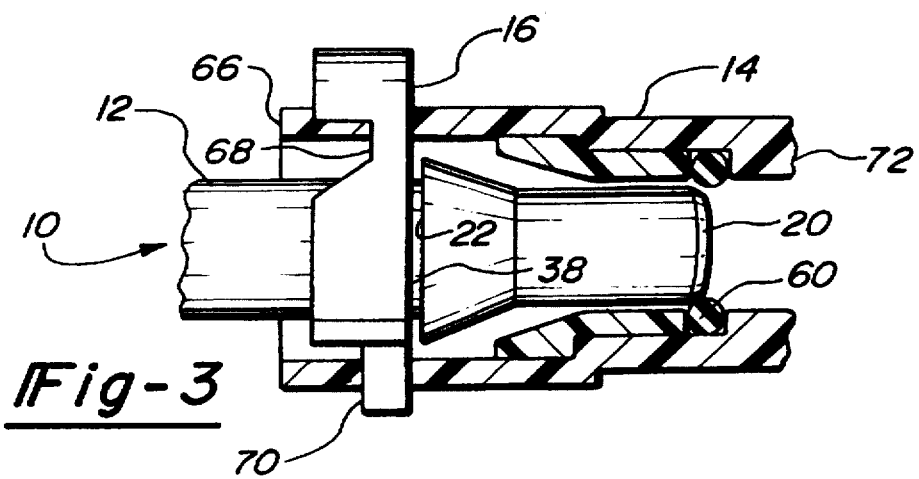

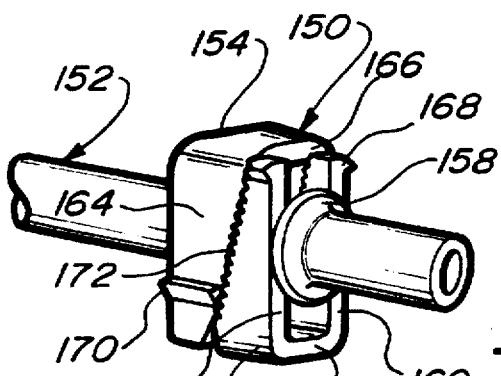
*Fig-10*
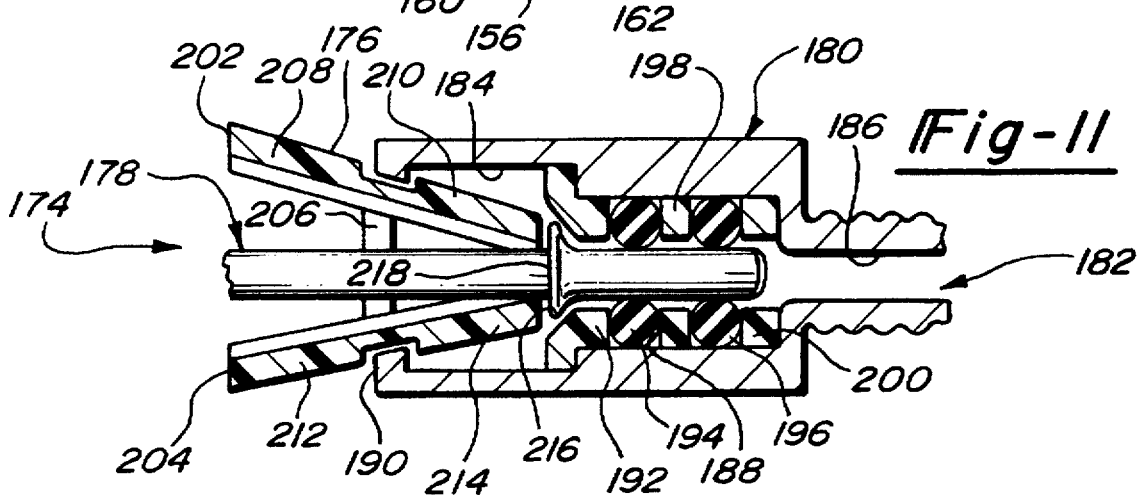
*Fig-11*
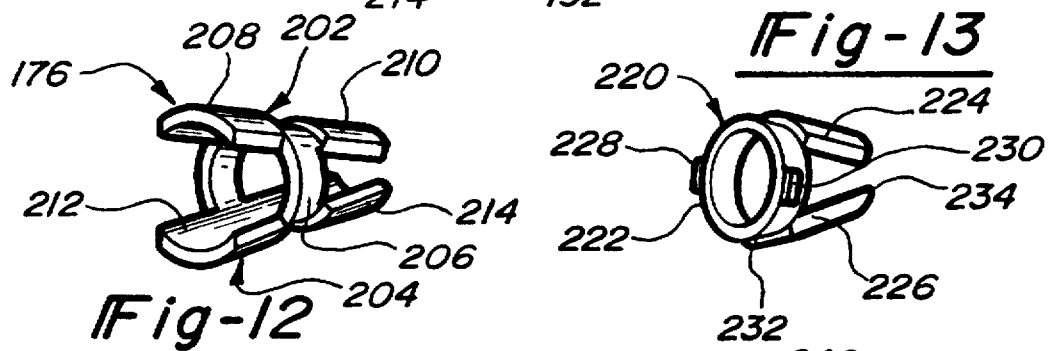
*Fig-12*   *Fig-13*
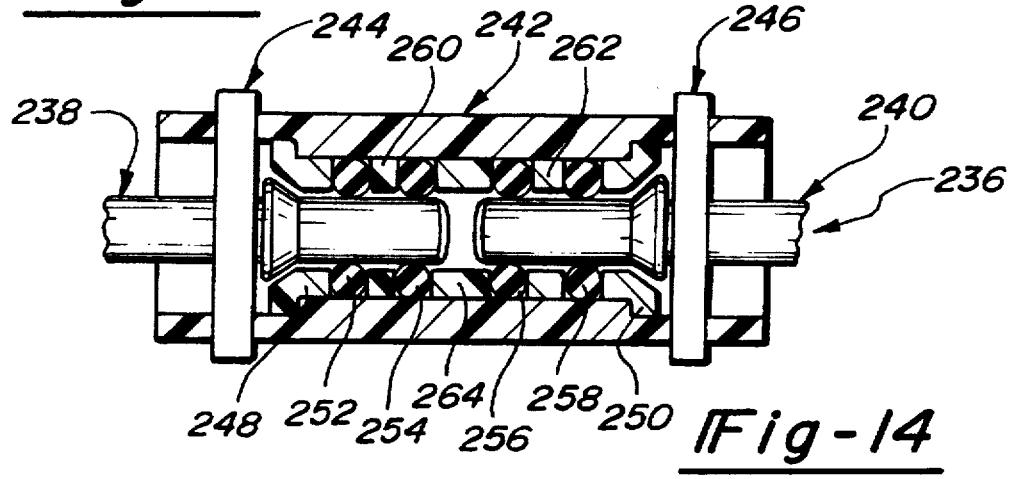
*Fig-14*

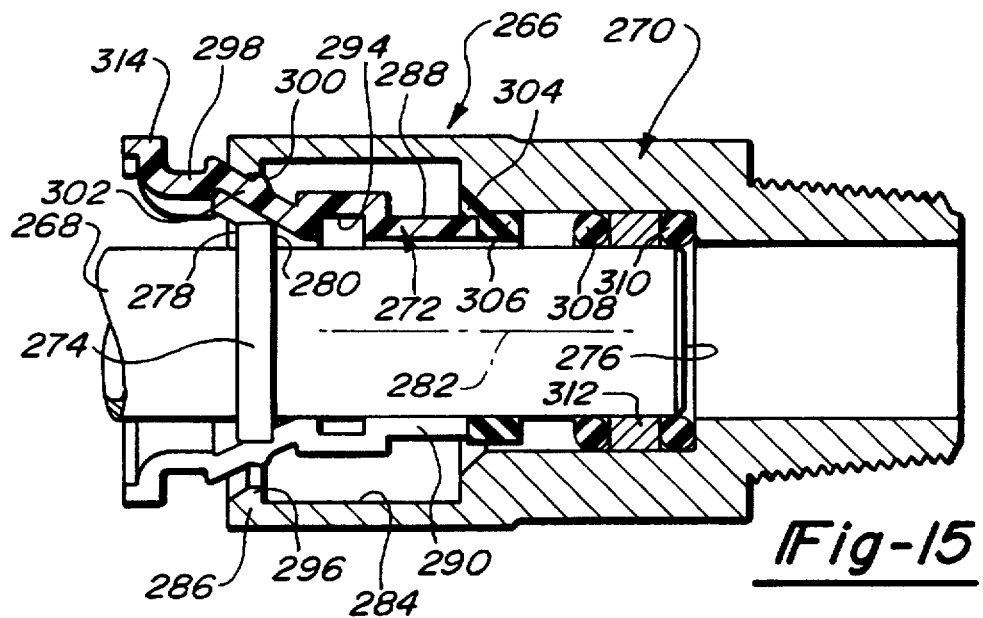
Fig-15
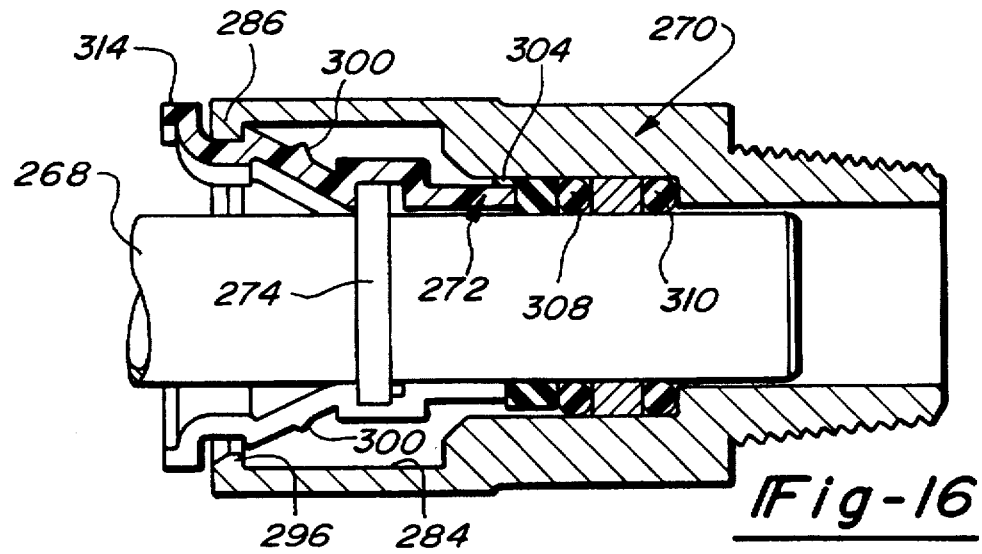
Fig-16
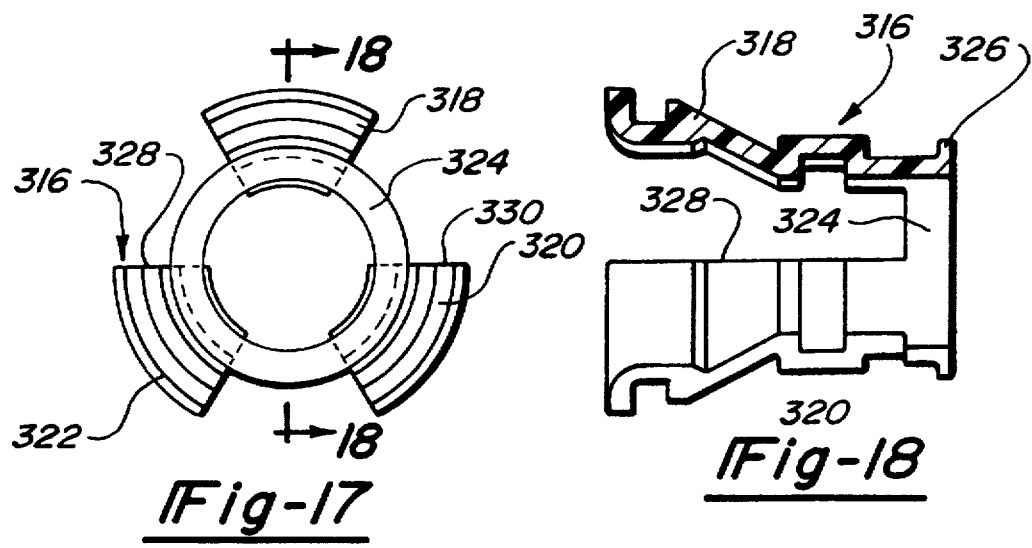
Fig-17
Fig-18

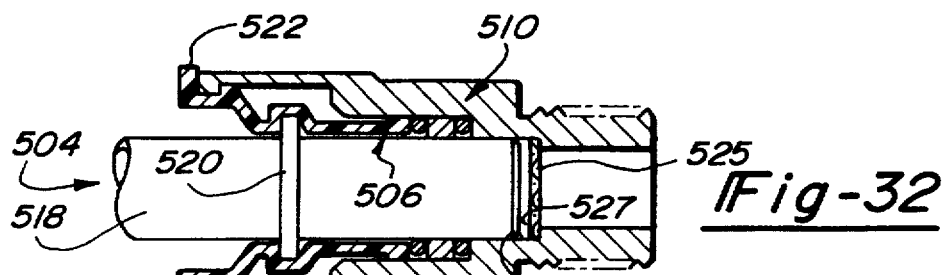
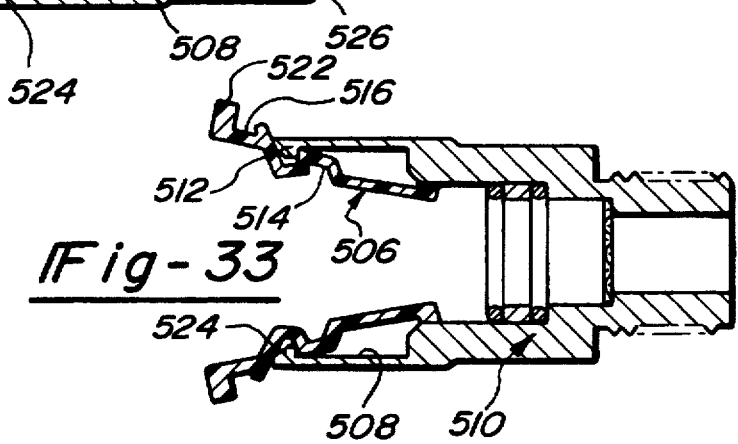
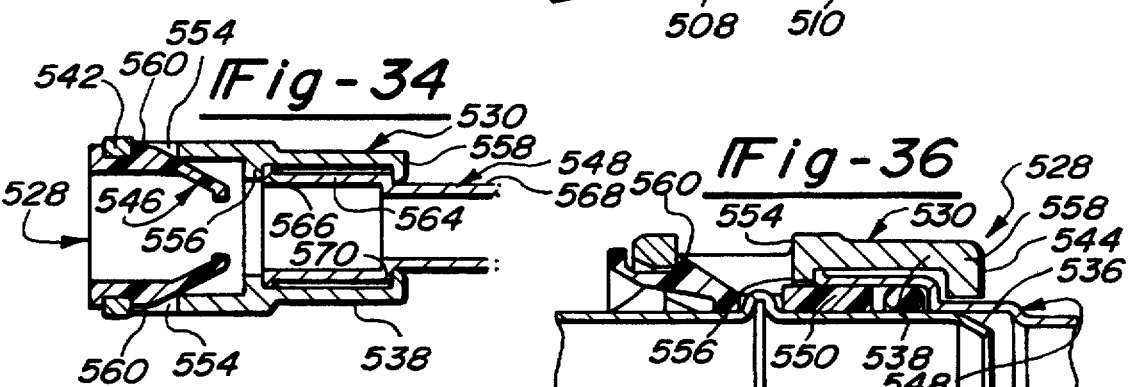
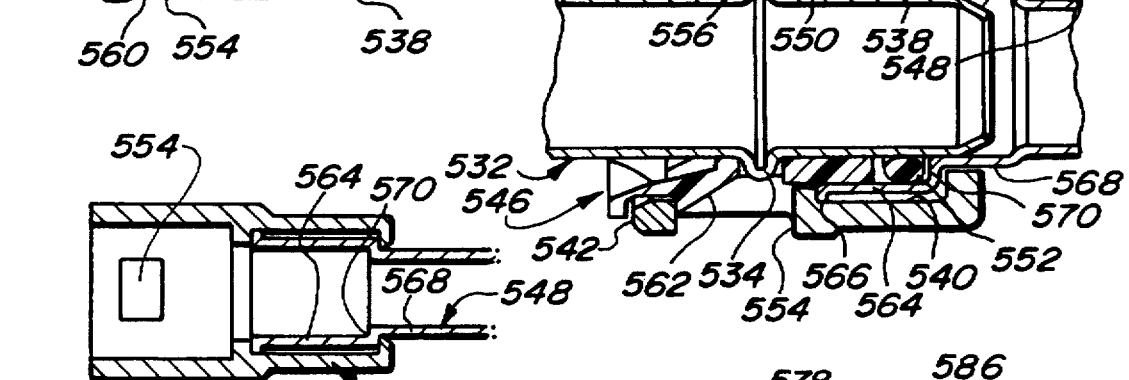
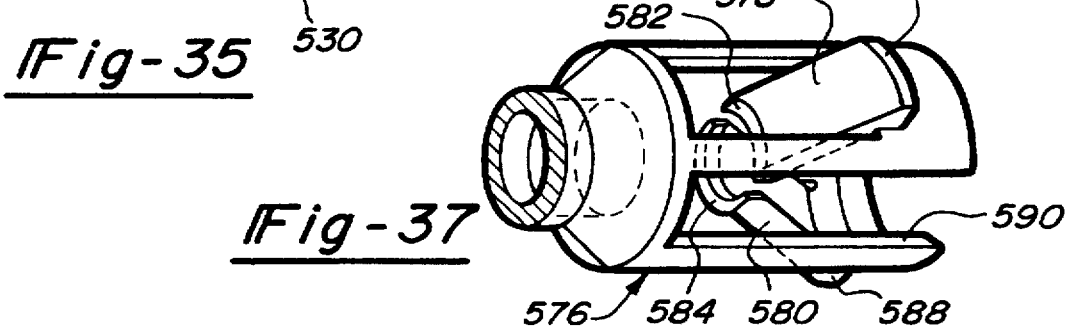

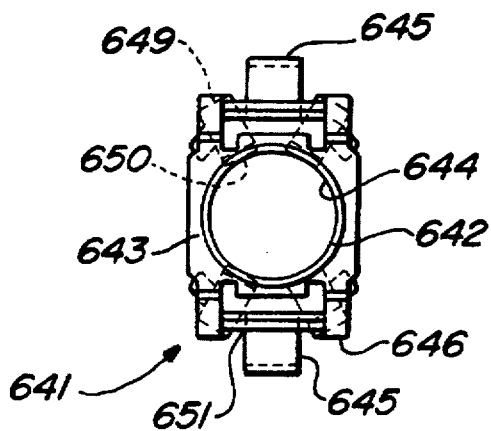
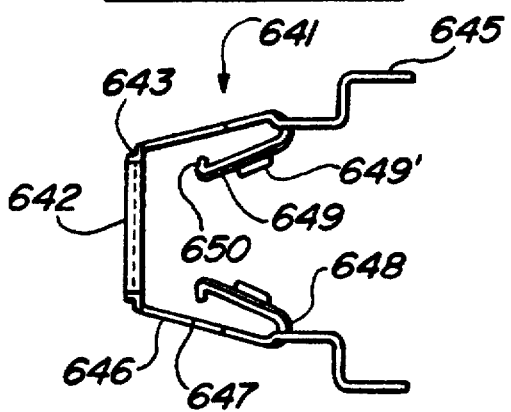
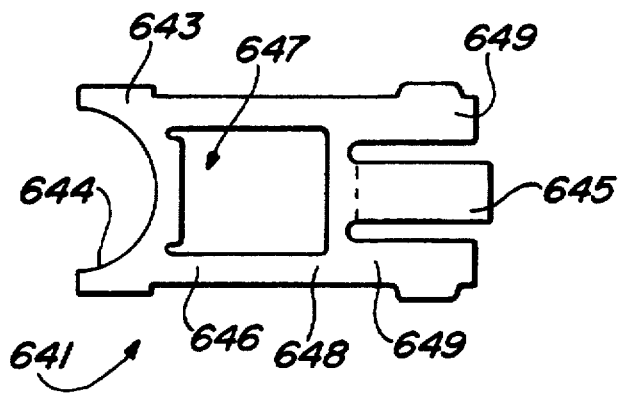
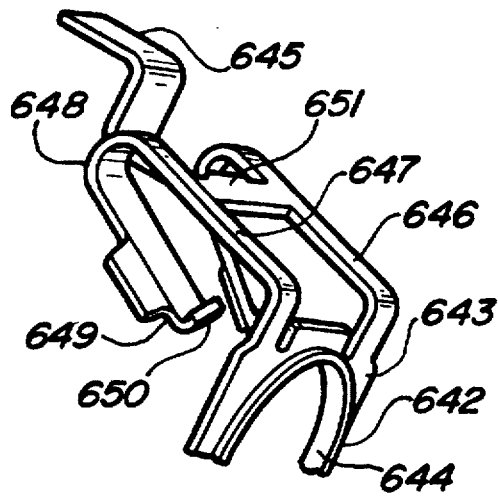
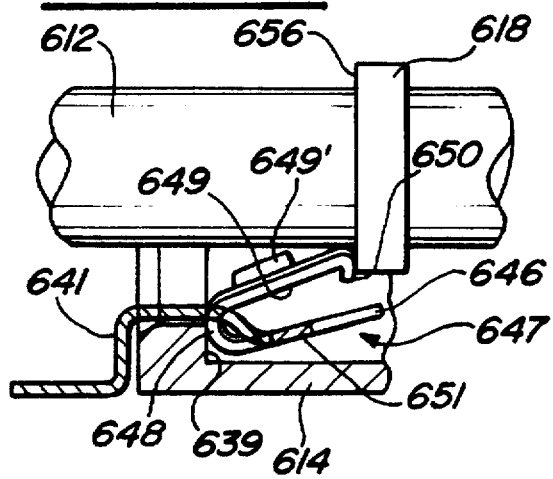
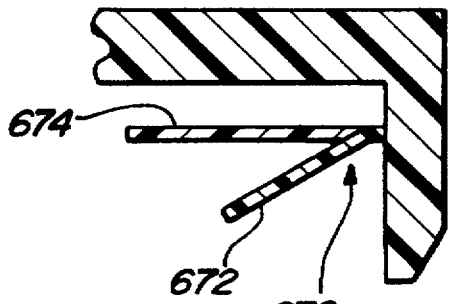

EQUAL TO    MORE STRESS ON BEND

SWIVELABLE QUICK CONNECTOR ASSEMBLY

CROSS REFERENCE TO RELATED APPLICATIONS

This application is a divisional of U.S. Ser. No. 08/437, 272, filed May 8, 1995, which is a continuation-in-part of U.S. Ser. No. 08/009,009, filed Jan. 26, 1993, issued on May 9, 1995, as U.S. Pat. No. 5,413,387, which is a divisional of 07/506,449, filed Apr. 6, 1990, now abandoned, which is a continuation of U.S. Ser. No. 07/360,405, filed Jun. 2, 1989, issued on Jun. 26, 1990, as U.S. Pat. No. 4,936,544, which is a divisional of U.S. Ser. No. 07/251,038, filed Sep. 26, 1988, issued on Apr. 10, 1990, as U.S. Pat. No. 4,915,136 which is a continuation of U.S. Ser. No. 07/127,532, filed Dec. 2, 1987, now abandoned, which is a continuation of U.S. Ser. No. 06/748,307, filed Jun. 24,1985, now abandoned, which is a continuation of U.S. Ser. No. 06/360, 201, filed Mar. 22, 1982, issued Jul. 22, 1986 as U.S. Pat. No. 4,601,497, which is a continuation-in-part of U.S. Ser. No. 06/201,711, filed Oct. 29, 1980, issued Jan. 3, 1984 as U.S. Pat. No. 4,423,892, all of which are incorporated herein by reference.

BACKGROUND OF THE INVENTION

1. Field of the Invention

The present invention relates to a connector assembly for providing connection between fluid carrying conduits. More particularly, the present invention relates to a swivelable connector assembly for providing a quick connection between fluid carrying conduits.

2. Description of the Relevant Art

In the automotive industry, as well as for many other industries, the need always exists for low-cost, reliable, and easy to assembly components. This need is especially apparent with respect to providing a connection between fluid carrying conduits, such as a fuel or refrigerant lines. In older threaded connectors, substantial assembly time could be accumulated in screwing on a cap to a fitting and tightening the cap down to the proper torque needed to provide for a fluid tight seal. Further, an inventory would have to be maintained to keep track of the number of caps and fittings, and any liners or other components that may be necessary. Also, retightening of the caps may be required to maintain the seal after the automobile or other system has been put in use.

SUMMARY OF THE PRESENT INVENTION

Accordingly, it is the primary object of the present invention to provide an improved connector assembly for providing a swivelable quick connection between fluid conveying conduits.

In addition, it is an object of the present invention to provide a pre-assembled connector housing and retainer element so that a connection to a tubular fluid conveying conduit may be made in one step without resorting to any tools.

Another object of the present invention is to provide a pre-assembled connector housing and retainer element so that a snapping connection may be made to a tubular fluid conveying conduit.

Another object of the present invention is to provide a connector assembly that may be employed to join dissimilar electrically conducting materials that would be otherwise subject to galvanic corrosion.

It is a further object of the present invention to provide a connector assembly which is adapted to provide for a bleed-down position when disconnecting a conduit from the housing of the connector assembly.

It is another object of the present invention to provide a pre-assembled connector conduit unit which requires only a one-step snapping connection to be joined to a connector housing.

It is yet another object of the present invention to provide a removable, disposable cover for protecting the pre-assembled connector conduit unit.

It is a further object of the present invention to provide a disposable stuffer-plug for the connector assembly which is adapted to install one or more sealing elements in an axial bore of the connector housing and detachably secure a retainer element to the connector housing, as well as to seal the axial bore of the connector housing.

It is still a further object of the present invention to provide a connector assembly which employs a check valve unit disposed in the axial bore of the housing for selectively blocking fluid flow.

It is also an object of the present invention to provide an improved retainer element which operates to both secure the conduit in the axial bore of the housing and position the sealing element within the axial bore of the housing.

It is a more specific object of the present invention to provide an improved retainer element formed with three or more leg members which operate to detachably secure the retainer element to the housing, the sealing means within the housing, the conduit in its operative position within the axial bore of the housing, and provide better resistance to off axis forces on the conduit.

To achieve the foregoing objects, the present invention provides a swivelable connector assembly which generally comprises a tubular conduit, a housing, sealing means, and retainer means. The tubular conduit is adapted to convey fluid and is formed with an annular projection disposed a predetermined distance from the end of the conduit to be connected. The housing is formed with an axial bore for receiving the conduit at a first end and for providing a fluid path at a second end, and includes an inwardly extending annular lip (or suitable apertures) at the first end to detachably secure the retainer means to the housing. The sealing means is disposed within the axial bore of the housing for providing a fluid tight seal between confronting portions of the conduit and the housing. The retainer means is adapted to be disposed generally within the axial bore of the housing for cooperating with the annular projection of the conduit to secure the conduit in its operative position within the axial bore of the housing. The retainer means includes three or more circumferentially spaced resilient deformable leg members which extend from an integral collar member at one end thereof. Each of the leg members has an outwardly opening channel portion which is adapted to receive the inwardly extending lip of the housing to secure the retainer means to the housing, and an inwardly opening channel portion adapted to receive the annular projection of the conduit for securing the conduit in its operative position within the axial bore of the housing. The ring from which the legs extend may additionally serve to position and retain the sealing means.

According to an alternate embodiment of the present invention, a swivelable connector assembly is provided which generally comprises a tubular conduit, a housing, sealing means, and retainer means. The tubular conduit is adapted to convey fluid and is formed with an annular projection disposed a predetermined distance from the end of the conduit to be connected. The housing is formed with an axial bore for receiving the conduit at a first end and for providing a fluid path at a second end, and includes an inwardly extending annular lip (or suitable apertures) at the first end to detachably secure the retainer means to the housing.

The sealing means is disposed within the axial bore of the housing for providing a fluid tight seal between confronting portions of the conduit and the housing. The retainer means is adapted to be disposed generally within the axial bore of the housing for cooperating with the annular projection of the conduit to secure the conduit in its operative position within the axial bore of the housing. The retainer means is a one piece metal retainer element which includes at least two circumferentially spaced leg members which extend from an integral collar member at one end thereof.

Each of the leg members has a deflectable leg portion which extends from the collar and ends in an arcuate first bend designed to provide a backstop for securing the retainer element in the connector assembly, and a retaining leg portion which extends from the deflectable leg portion and inclines generally toward the aperture in the collar. The end of the retaining leg portion is formed to engage the conduit such that the retaining leg portion will resist the disconnection of the conduit from the connector assembly.

Additional objects and advantages of the present invention will become apparent from reading of the detailed description of the preferred embodiments which makes reference to the following set of drawings in which:

BRIEF DESCRIPTION OF THE DRAWINGS

FIG. 1 is a perspective assembly view of a first embodiment of the present invention;

FIG. 2 is a side elevation view, partially in cross-section, of the connector assembly of FIG. 1;

FIG. 3 is another view of the connector assembly of FIG. 2, shown in the bleed-down position;

FIG. 10 is a perspective view of a fifth embodiment of a retainer element, and its relationship to a conduit is illustrated;

FIG. 11 is a side elevation view of another embodiment of the connector assembly according to the present invention;

FIG. 12 is a perspective view of the retainer element of FIG. 11;

FIG. 13 is a perspective view of another embodiment of the retainer element for the connector assembly of FIG. 11;

FIG. 14 is a side elevation view, partially in cross-section of another embodiment of the connector assembly according to the present invention;

FIG. 15 is a side elevation view, partially in cross-section, of a connector assembly according to the present invention in a partially installed position;

FIG. 16 is a side elevation view, partially in cross-section, of the connector assembly illustrated in FIG. 15 with the tubular conduit shown in its operative position in the axial bore of the housing;

FIG. 17 is a front elevation view of an improved retainer element;

FIG. 18 is a side elevation view, partially in cross-section, of the retainer element illustrated in FIG. 17, taken along lines A—A;

FIG. 32 is a side elevation view, partially in cross-section of another connector assembly according to the present invention;

FIG. 33 is a cross-sectional side elevation view of the connector assembly illustrated in FIG. 32, particularly showing the retainer element in a partially installed position;

FIG. 34 is a cross-sectional side elevation view of another connector assembly according to the present invention;

FIG. 35 is a cross-sectional side elevation view of the connector assembly illustrated in FIG. 34, particularly showing the connector housing;

FIG. 36 is a side elevation view of the connector assembly described in connection with FIGS. 34 and 35;

FIG. 37 is a perspective view, partially in cross-section, of another embodiment of a connector housing particularly featuring an integral retainer means;

FIG. 40 is an end view of the retainer element of FIG. 38 shown in isolation;

FIG. 41 is a side view of the retainer element of FIG. 38 shown in isolation;

FIG. 42 is an expanded plan view of half of the blank for the retainer element of FIG. 38;

FIG. 43 is a partial cross-sectional perspective view of the retainer element of FIG. 38;

FIG. 44 is a side elevational view in partial cross section of a portion of the retainer element of FIG. 38 in position between the male conduit and the female housing;

FIG. 45 is a partial view of a prior art connector retaining element shown in relation with a female housing;

DETAILED DESCRIPTION OF THE PREFERRED EMBODIMENTS

Figure 4:
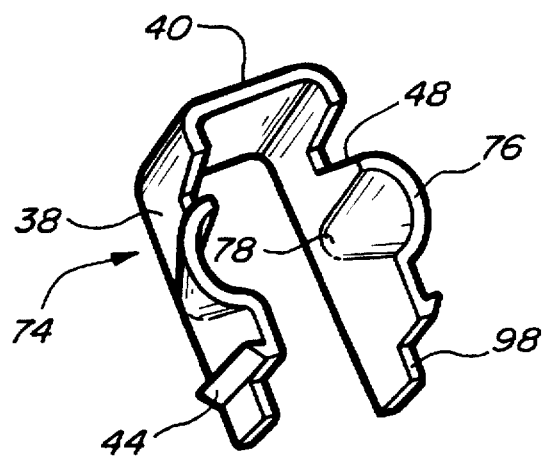
FIG. 4 is a perspective view of a second embodiment of a retainer element according to the present invention.

Referring to FIG. 1, a perspective assembly view of a connector assembly 10 according to the present invention is shown. The connector assembly is generally comprised of a tubular conduit 12 adapted to convey fluid, a housing 14, and a retainer element 16. Conduit 12 is provided with an outwardly projecting annular surface 18 displaced from a beveled connecting end 20 of the conduit. Annular surface 18 is formed with a blocking wall portion 22 disposed transversely or perpendicularly to a central axis 24 of conduit 12, and a sloping wall portion 26 gradually increasing from an outer surface 28 of the conduit. Housing 14 may have any suitable outer surface shape, and in one form of the present invention, the housing is provided with an enlarged diameter portion 30, a reduced diameter portion 32, and a third diameter portion 34. The housing is adapted to provide for apertures or openings 36 a–d, which are equidistantly spaced around the circumference of enlarged portion 30 of the housing. Apertures 36 are provided to receive and position retainer element 16 transversely to axis 24 of the conduit. The retainer element is made from a resilient material, such as plastic, and is comprised of a pair of generally parallel elongated legs 38 jointed at one end by a cross member 40, which provides a separation between the legs approximately equal to the outside diameter of conduit 12. Each retainer leg 38 includes a sloping lead area 42 formed in the interior side of the leg, and a barb 44 projecting from the exterior side of the leg. In addition, each retainer leg further includes a first recess 46 and a second recess 48 formed in the front side of the leg.

Referring to FIG. 2, a side elevation view of connector assembly 10 is shown, partially in cross-section, in a fully assembled position. Housing 14 is shown to be formed with a central bore 50, having an enlarged diameter portion 52, a reduced diameter portion 54, and a third diameter portion 56. Housing 14 also includes a bushing 58 and an elastomeric ring 60 disposed in third diameter portion 56 of housing central bore 50. Bushing 58 also includes a flange portion 62, which extends into enlarged diameter portion 52 of central bore 50. A surface 64 of flange portion 62 is shaped to provide a slope corresponding to sloping wall portion 26 of conduit 12.

In the preferred embodiment, connector assembly 10 may be connected by first coupling retainer element 16 to housing 14, and then inserting connecting end 20 of conduit 12 into central bore 50 of the housing. Retainer element 16 is coupled to housing 14 by inserting legs 38 into apertures 36a and 36b and out through apertures 36c and 36d. Barbs 44 projects outwardly a distance sufficient to engage the upper edges of apertures 36c and 36d and prevent the removal of the retainer element from the housing. Apertures 36 a–d are shaped sufficiently large to permit both an inward and outward deflection of retainer legs 38. When retainer element 16 is being inserted into housing 14, the retainer legs deflect inwardly to permit barbs 44 to extend through apertures 36c and 36d. When connecting end 20 of conduit 12 is being inserted into bore 50 of housing 14, the retainer legs deflect outwardly to permit annular surface 18 to translate past the retainer legs. Sloping wall portion 26 of annular surface 18 cooperates with sloping lead area of retainer legs 38 to reduce the force required to translate the annular surface past the retainer legs. After conduit 12 is fully inserted into central bore 50 of housing 14, as shown in FIG. 2, retainer legs 38 cooperate with blocking wall portion 22 of annular surface 18 to resist the disconnection or removal of conduit 12 from housing 14.

An important feature of housing 14 is elastomeric ring 60. This ring provides a fluid tight seal between conduit 12 and housing 14, and yet permits the conduit to rotate or swivel relative to the housing. Ring 60 is positioned transversely to axis 24 of conduit 12 by bushing 58. Flange portion 62 of bushing 58 provides a means for impeding further insertion of conduit 12 within central bore 50 when surface 64 of flange portion 62 contacts sloping wall portion 26 of annular surface 26 of the conduit.

Referring to FIG. 3, another view of connector assembly 10 is shown. Here, the connector assembly is illustrated in the "bleed-down" position. This feature of the invention may be used to safely disconnect conduit 12 from housing 14 when the fluid pressure is greater than ambient. According, retainer element 16 is partially removed or lifted up to the point where first and second recesses, 46 and 48 respectively, permit the retainer element to be translated toward a first end 66 of housing 14, in the direction of the arrows shown in FIG. 2. Surfaces 68 and 70 of the retainer recesses will engage the vertical edges of apertures 36 a–d adjacent to housing end 66, and prevent further axial translation of retainer element 16. Conduit 12 may then also be translated toward housing end 66, past the point where elastomeric ring 60 contacts conduit end 20. This will interrupt the fluid tight seal, and permit the pressure of the fluid to rapidly decrease. When this seal is broken, legs 38 of retainer element 16 will prevent the total ejection of the conduit from the housing under the force of the fluid pressure by engaging blocking wall portion 22 of annular surface 18. After the fluid pressure has decreased to the ambient pressure, the conduit may then be translated back toward a second end 72 of the housing, so that the retainer element may be removed. The conduit may then be removed from the housing without any obstruction.

Referring to FIG. 4, a second embodiment of a retainer element 74 is shown. Retainer element 74 is similar to retainer element 16, and the reference numerals for the corresponding components are the same. As in the case of retainer element 16, retainer element 74 is an integral element, formed in any convention manner from a resilient material, such as plastic. The difference between these retainers resides in the lead areas formed in the sides of the legs 38. Retainer element 74 is formed with an annular outwardly extending lead area 76 in each of the legs. Leads ares 76 have approximately the same thickness as the thickness of legs 38. Leads areas 76 may extend to the back surface of retainer element 74, or may only partially extend the width of legs 38, as shown in FIG. 4 at reference numeral 78. In contrast, lead areas 42 of retainer element 16 do not outwardly extend. Rather, lead areas 42 are recessed in the interior sides of legs 38 for retainer element 16. Thus, the thickness of legs 38 for retainer element 16 is reduced at the front surface of the legs, and gradually increases to the normal leg thickness at the back surface.

Figure 5:
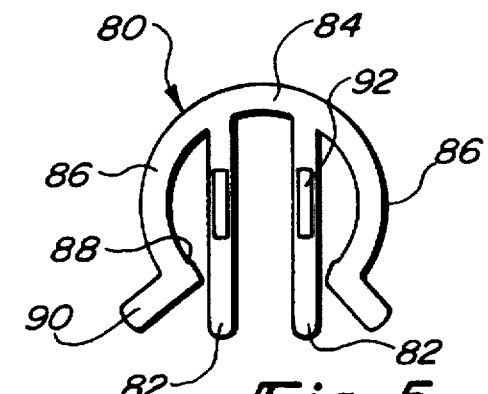
FIG. 5 is a front elevation view of a third embodiment of a retainer element according to the present invention.

Referring to FIG. 5, a third embodiment of a retainer element 80 is shown. Retainer element 80 is also intended for use with housing 14 shown in FIG. 1. Retainer element 80 is made from a resilient material, and is comprised of a pair of generally parallel elongated legs 82 joined at one end by a cross member 84, which is extended to form annular members 86. These annular members generally conform to and partially encircle the outside surface of enlarged diameter portion 30 of housing 14. Annular members 86 are each formed with a barb 88 and a handle 90. Legs 82 are each formed with a lead area 92 similar in shape to lead area 42 for legs 38 of retainer element 16.

Retainer element 80 is coupled to housing 14 by inserting legs 82 into apertures 36a and 36b. As legs 82 are being inserted, annular members 86 deflect outwardly to permit their translation around the outside surface of housing 14. When the retainer element is fully inserted, barbs 88 will extend inwardly into apertures 36c and 36d to lock the retainer element in place. Handles 90 are used to assist the removal of retainer element 80 from housing 14, which is achieved by deflecting annular member 86 outwardly to disengage barbs 88 from the apertures and lifting the retainer element out from the housing.

Figure 6:
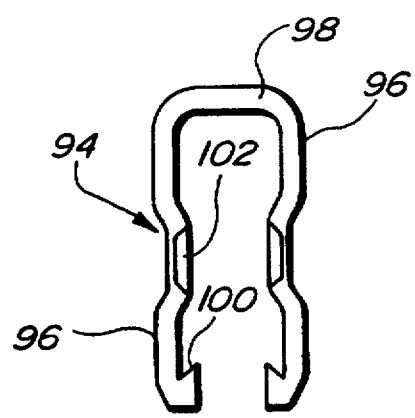
FIG. 6 is a front elevation view of a fourth embodiment of a retainer element according to the present invention.

Referring to FIG. 6, a fourth embodiment of a retainer element 94 is shown. Again, retainer element may be used with housing 14, and is made from a resilient material. Retainer element 94 is comprised of a pair of generally parallel elongated legs 96 joined at one end by a cross member 98. Legs 96 are each formed with an inwardly extending barb 100, and a lead area 102 similar in shape to lead area 42 of retainer element 16. Retainer element 94 is coupled to housing 14 by deflecting legs 96 outwardly a sufficient distance to permit their insertion into apertures 36a and 36b and out through apertures 36c and 36d. When fully inserted, barbs 100 engage the lower lateral edges of apertures 36c and 36d to lock retainer element in place.

Figure 7:
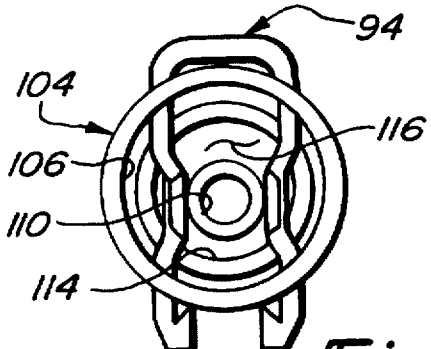
FIG. 7 is a front elevation view of the retainer element of FIG. 6 coupled to a housing according to the present invention.
Figure 8:
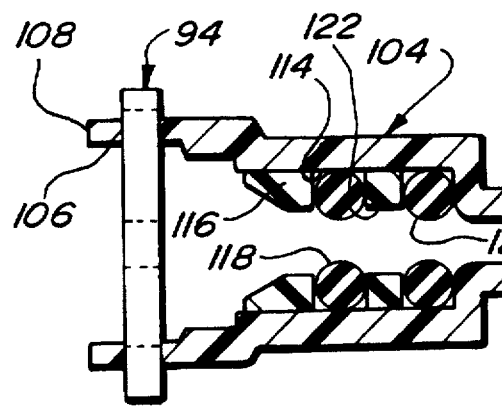
FIG. 8 is a side elevation view, partially in cross-section, of the retainer element and housing of FIG. 7.

Referring to FIGS. 7 and 8, retainer element 94 is shown coupled to a housing 104, similar in construction to housing 14. FIG. 7 is a front elevation view and FIG. 8 is a side elevation view partially in cross-section. Housing 104 is provided with an enlarged diameter portion 106 at a first end 108 for receiving a conduit and for mounting retainer element 94, and a reduced diameter portion 110 at a second end 112 for providing a fluid path. Housing 104 is also provided with an third diameter portion 114 interposed between enlarged diameter portion 106 and reduced diameter portion 110. Housing 104 further includes a bushing 116, two elastomeric rings 118 and 120, and an annular sleeve 122 for separating the rings. This housing illustrates that more than one elastomeric ring may be employed to provide a fluid tight seal, as may be required for the particular application of the connector assembly.

Figure 9:
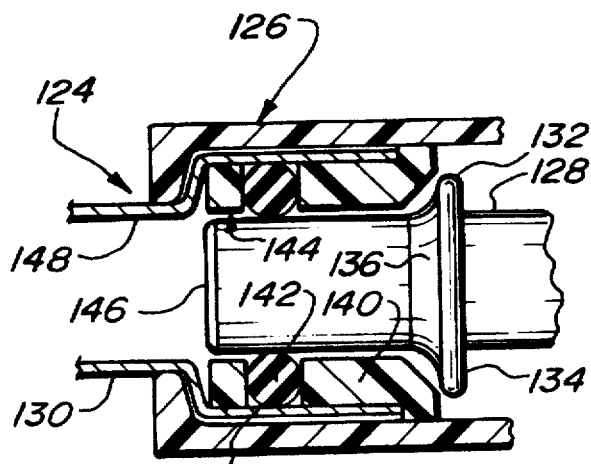
FIG. 9 is a side elevation view, partially in cross-section, of another embodiment of the connector assembly according to the present invention.

Referring to FIG. 9, another embodiment of a connector assembly 124 according to the present invention is shown. This embodiment illustrates a housing 126 that may be employed to provide a fluid tight connection between a tubular conduit 128 and a metallic tubular conduit 130. As in the case of conduit 12 of FIG. 1, conduit 128 includes an outwardly projecting annular surface 132, which is formed with a blocking wall portion 134 and a sloping wall portion 136. Conduit 130 is formed with an enlarged diameter portion 138, which provides the third diameter portion of the above described housings 14 and 104. Housing 126 is provided with a bushing 140, an elastomeric ring 142, and a spacer 144 mounted in enlarged diameter portion 138 of conduit 130. Both bushing 140 and spacer 144 are made from an electrically non-conductive material, such as plastic, and serve an important function when both conduits 128 and 130 are made from dissimilar metals subject to galvanic corrosion. Bushing 140 and spacer 144 support conduit 128 within housing 126 and preclude an end 146 of conduit 128 from contacting a reduced diameter portion 148 of conduit 130. Thus, where the fluid being conveyed is a liquid having the properties of an electrolyte, bushing 140 and spacer 144 prevent the completion of a circuit loop which would allow a corrosion current to flow. Housing 126, as well as housings 14 and 104, may be made from either plastic or metal. Any of the retainer elements 16, 74, 80, or 94 may be coupled with housing 126 in the manner described above.

Referring to FIG. 10, a fifth embodiment of a retainer element 150 is shown in relation to a conduit 152. Retainer element 150 is comprised of two wedge shaped members 154 and 156, which combine to form a jam fit against the blocking wall portion (not shown) of an annular surface 158 of conduit 152. Wedge member 156 is comprised of a pair of generally parallel elongated legs 160 joined at one end by a cross member 162. Similarly, wedge member 14 is comprised of a pair of generally parallel elongated legs 164 joined at one end by a cross member 166. Wedge member 156 further includes an outwardly extending barb 168 formed at the end of each of legs 160. Similarly wedge member 154 includes an outwardly extending barb 170 formed in the side of each of legs 164. The sides of the legs 160 and 164 where wedge members 156 and 154 are joined are reciprocably slanted and formed with serrations, as indicated generally at reference number 172. Retainer element 150 may be coupled to a housing, such as housing 14 of FIG. 1 to force annular surface 158 of conduit 152 securely against a bushing, such as bushing 58 of FIG. 2. Retainer element 150 may be coupled to housing 14 by inserting legs 164 of wedge member 154 into apertures 36a and 36b, and inserting legs 160 of wedge member 156 into apertures 36c and 36d in a similar manner to that described above for retainer element 16. As the wedge members are being inserted, the serrated edges of legs 160 and 164 engage and exert a further insertion force on conduit 152 via annular surface 158. After the wedge members are fully inserted, the serrated edges of legs 160 and 164 fixedly hold the wedge members in their relative positions. It of course should be appreciated by one skilled in the art that conduit 152 may be inserted into housing 14 before the wedge members are coupled to the housing.

Referring to FIGS. 11 and 12, another embodiment of a connector assembly 174 according to the present invention is shown. FIG. 12 illustrates a perspective view of a retainer element 176, and FIG. 11 illustrates a side elevation view, partially in cross-section, of the fully assembled connector assembly. Connector assembly 174 is comprised of a tubular conduit 178, a housing 180, and retainer element 176. Housing 180 may be made from any suitable material, such as plastic or metal, and may have any appropriate outer shape, such as a cylinder or hex construction. Housing 180 is formed with a central bore 182, which provides an enlarged diameter portion 184, a reduced diameter portion 106, and a third diameter portion 188. Housing 180 further includes an inwardly extending flange 190, forming a fourth diameter portion, for mounting retainer element 176 to the housing. Flange 190 may have a slant shape as shown in FIG. 11 or may have a flat surface. Housing 180 is also provided with a bushing 192, two elastomeric rings 194 and 196, a sleeve 198, and a spacer 200 generally mounted in third diameter portion 188. Retainer element 176 is made from a resilient material, and is comprised of a pair of opposing annular leg members 202 and 204 centrally joined by a recessed ring 206, which positions the retainer element at flange 190 of housing 180. Annular leg 202 is formed with a radially extending tab end 208 on one side of recessed ring 206 and a radially converging jaw end 210 on the other side of the recessed ring. Similarly, annular leg 204 is formed with a radially extending tab 212 on one side of recessed ring 206 and a radially converging jaw 214 on the other side. As illustrated in FIG. 11, the distance between annular leg members 202 and 204 at the converging ends corresponds approximately to the outside diameter of conduit 178. Retainer element 176 is coupled to housing 180 by insertion into central bore 182 until flange 190 engages or straddles recessed ring 206. Conduit 178 is then inserted into central bore 182 with an insertion force sufficient to deflect converging jaw ends 210 and 214 outwardly to permit an annular surface 216 of the conduit to be translated past retainer element 176. After conduit 178 is fully inserted into housing 180, converging jaw ends 210 and 214 of retainer element 176 cooperate with a blocking wall portion 218 of annular surface 216 to resist the disconnection or removal of conduit 178 from the housing. Conduit 178 may be removed from housing 180 by compressing extending tab ends 208 and 212 together sufficiently to extend converging jaw ends 210 and 214 apart, so that the conduit may be extracted from the housing without having to remove retainer element 176.

Referring to FIG. 13, another embodiment of a retainer element 220 for the connector assembly of FIG. 11 is shown. Retainer element 220 is made from a resilient material, and is comprised of a ring 222 for mounting the retainer element on flange 190 of housing 180, a pair of opposing jaws 224 and 226 projecting from one side of the ring, and a pair of tabs 228 and 230 projecting from the other side of the ring and positioned on opposite sides of the jaws. Ring 222 is formed with an outer diameter approximately corresponding to the bore diameter provided by flange 190 of housing 180. Jaws 224 and 226 extend beyond the outer diameter of ring 222 at an end 232 and converge at another end 234 to provide a separation approximately corresponding to the outer diameter of conduit 178. When retainer element 220 is coupled to housing 1 80, flange 190 is interposed between tabs 228 and 230, and extending end of jaws 224 and 226. Retainer element 220 operates to maintain conduit 178 in housing 180 in a similar manner to that described above for retainer element 176. However, retainer element 220 is of a simplified design in that the retainer element is not provided with an integral means to assist the removal of conduit 178 from housing 180.

Referring to FIG. 14, another embodiment of a connector assembly 236 according to the present invention is shown. Connector assembly 236 represents a union-type connector, and is essentially a duplicate of the structure described above for the previous embodiments. Generally, connector assembly 236 is comprised of two conduits 238 and 240, a housing 242, and a pair of retainer elements 244 and 246. Housing 242 includes a pair of bushings 248 and 250, a set of four elastomeric rings 252–258, a pair of sleeves 260 and 263, and a central spacer 264.

Referring to FIG. 15, a side elevation view of a connector assembly 266 is shown, partially in cross-section, in a partially installed position. The connector assembly 266 includes a tubular conduit 268, a housing 270, and a retainer element 272. The conduit 268 is formed with an annular projection 274 disposed a predetermined lead distance from an end 276 of the conduit to be connected. It should be noted that the annular projection 274 is symmetrical in shape, in that the opposing surfaces 278 and 280 of the projection are generally transverse to a central axis 282 of the conduit 268 and generally parallel each other.

The retainer element 272 is adapted to be disposed generally within an axial bore 284 of the housing 270 and is detachably secured to the housing at a first end 286 of the housing. The retainer serves to secure the conduit 268 in its operative position within the axial bore 284 of the housing 270 by cooperating with the annular projection 274 of the conduit. The retainer element 272 includes three circumferentially spaced resilient, deformable leg members, of which only two leg members 288 and 290 are shown in FIG. 1. These leg members extend from an integral collar member 292 at one end of the retainer element 272. The collar member 292 is adapted to provide an opening sufficient to permit the end 276 of the conduit to pass therethrough. Each of the leg members is formed with an inwardly opening channel portion 294 which is adapted to receive the annular projection 274 of the conduit 268 for securing the conduit in its operative position within the axial bore 284 of the housing 270. The shape of the inwardly opening channel portion 294 of the leg members is generally complimentary to the shape of the annular projection 274 of the conduit. Although various suitable shapes may be provided for the inwardly opening channel portion 294 and the annular projection 274, the shapes should be such as to lock the conduit into the axial bore 284 of the housing and prevent or limit axial movement of the conduit relative to the housing. Each of the leg members are also formed with an outwardly opening channel portion 296 which is adapted to receive an inwardly extending annular lip 298 of the housing to secure the retainer element 272 to the housing. The shape of the outwardly opening channel portion 298 of the leg members and the annular lip 296 of the housing are subject to the same considerations noted above for the inwardly opening channel portion 294 of the leg members and the annular projection 274 of the conduit 268. However, it may also be noted that rather than forming the annular lip 296 of the housing 270 by casting or milling, the annular lip may also be formed by rolling in the first end 286 of the housing.

The leg members (288, 290) of the retainer element 272 are adapted to deform in response to the insertion of the retainer element into the axial bore 284 of the housing 270 and permit the annular lip 296 of the housing to snap into the outwardly opening channel portion of each of the leg members.

Similarly, the leg members of the retainer element 272 are adapted to deform in response to the insertion of the conduit 268 into the axial bore 284 of the housing 270 and through the collar member 292 of the retainer element 272, and permit the annular projection 274 of the conduit to snap into the inwardly opening channel portion 294 of the leg members. However, one feature of the connector assembly 266 is that the annular projection 274 of the conduit is adapted to snap into the inwardly opening channel portion 294 of the leg members (288, 290) before the annular lip 296 of the housing 270 snaps into the outwardly opening channel portion 298 of the leg members. This feature will permit the annular projection 274 of the conduit to easily snap into the inwardly opening channel portion 294 of the leg members. This feature is achieved by providing for two sets of tabs which cooperate to maintain the retainer element 272 in the partially installed position shown in FIG. 1 until the annular projection 274 of the conduit 268 has snapped into the inwardly opening channel portion 294 of the retainer element leg member members. The first set of tabs 300 extend outwardly along an inclined portion 302 of the retainer element leg members, and operate to prevent the retainer element 272 from falling out of the axial bore 284 of the housing 270. One or more first tabs 300 may be provided on each of the retainer element leg members as may be appropriate in the particular application. The second set of tabs 304 are formed to extend generally outwardly from a bushing 306 disposed within the axial bore 284 of the housing 270. The second tabs 304 are shaped such that they will resist the further insertion of the retainer element 272 into the axial bore 284 from the partially installed position until the annular projection 274 snaps into the inwardly opening channel portion 294 of the retainer element. However, once the conduit 268 is thus joined or united to the retainer element 272, the second tabs 304 will yield and deflect inwardly to permit the further insertion of the conduit 268 and the retainer element 272 into the axial bore 284 of the housing 270 until the annular lip 296 of the housing snaps into the outwardly opening channel portion 298 of each of the retainer element leg members and the conduit is in its operative position within the axial bore of the housing. FIG. 2 illustrates the connector assembly 266 with the conduit 268 shown in its operative position within the axial bore 284 of the housing 270.

The connector assembly 266 also includes two elastomeric rings 308 and 310 disposed within the axial bore 284 of the housing 270 for providing a fluid tight seal between confronting portions of the conduit 268 and the housing. The elastomeric rings are also separated by a suitable sleeve 312. It should be noted that once the conduit 268 is connected to the housing 270 via the retainer element 272, the conduit may be subsequently released and withdrawn from the axial bore 284 of the housing as follows. By manually deflecting each of the retainer element leg members at a finger portion 314 (extending out of the bore 284 of the housing) inwardly toward the central axis 282 sufficiently to disengage the annular lip 296 of the housing from the outwardly opening channel portion 298 of the leg members, the conduit 268 and the retainer element 272 will be permitted to slide out of the axial bore of the housing. It should be appreciated that the dimensions of the retainer element 272 and the housing 270 relative to the outer diameter of the conduit 268 should be such as to provide sufficient radial clearance between the retainer element and the conduit to permit the deflection of the retainer element leg members necessary for the outwardly opening channel portion 298 to clear the annular lip 296 of the housing. Accordingly, it will be seen that the connector assembly 266 is adapted to readily permit subsequent disconnection of the conduit from the housing. One advantage of this feature of the present invention is that seals may be conveniently replaced without having to replace any of the other components of the connector assembly.

Referring to FIGS. 17 and 18, a front and a side elevation view of a retainer element 316 is shown. Retainer element 316 is similar to the retainer element 272, in that it generally comprises three circumferentially spaced resilient, deformable leg members 318, 320 and 322, extending from an integral collar member 324 at one end thereof. However, as best illustrated in FIG. 18, the retainer element 316 includes an annular flange 326 extending outwardly from the collar member 324 for positioning the sealing element(s) within the axial bore of the connector housing. Since the flange 326 serves a principal function normally provided by a bushing, it should be appreciated that the need for the bushing may be eliminated in the appropriate application.

As may best be illustrated in FIG. 17, in one form of the present invention the leg members 318-320 are equally spaced circumferentially, and the opposing axially extending edges of any two of the leg members from a substantially straight line. For example, edge 328 of leg member 322 and edge 330 of leg member 320 form a horizontally-extending straight line. Thus it may also be noted that any two of the leg members span a maximum of one hundred and eight degrees (180°) (including the circumferential space between the leg members). It may also be noted that the provision of three leg members provides certain advantages in relation to a retainer element with either two or four leg members. For example, in order to disconnect a conduit from a housing, the finger portions of a three leg retainer element will be easier to grasp than a four leg retainer element. Additionally, a three leg retainer element will provide greater circumferential engagement than a two leg retainer element. Furthermore, with a two leg retainer element, a larger diameter connector housing will be required relative to a three leg retainer element in order to permit the leg members to expand around the annular projection of the conduit.

With respect to the materials from which retainer elements 272 and 316 may be constructed, flexible thermoplastic or metal spring stock which will withstand the temperature and chemical environment expected to be encountered in the application is preferred. For example, typical nylons which are considered to be useful are types 6, 6—6, 6–10, 6–12, 11 and 12. It may also be appropriate to add glass reinforcement up to 30% for increased strength in the particular application.

Figure 19:
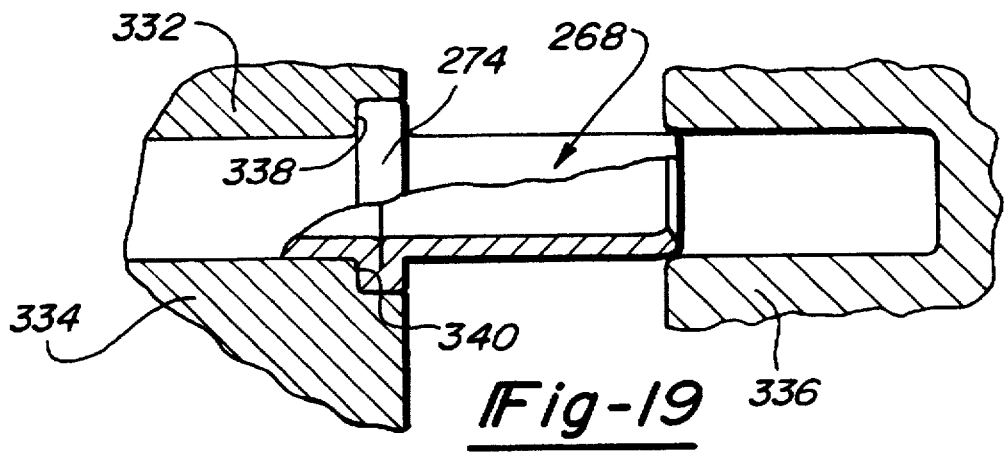
FIG. 19 is a side elevation view, partially in cross-section of the tubular conduit illustrated in FIGS. 15 and 16.

Referring to FIG. 19, a side elevation view of the tubular conduit 268 of FIG. 15 is shown, partially in cross-section. In particular, the conduit 268 is shown in relation to a set of forming dies 332, 334 and 336, which are used to form or coin the annular projection 274 of the conduit. Briefly, forming dies 332 and 334 clamp the conduit on one side of the projection to be formed, and the forming die 336 slides over or clamps the other side of the conduit. Then, as the forming die 336 is drawn into engagement with the forming dies 332 and 334, the conduit will buckle outwardly and conform itself to the shape of the recesses 338 and 340 provided in the forming dies 332 and 334 respectively. It should be noted that this type of annular projection provides certain manufacturing advantages over previous projections having a sloping or tapered lead-in portion, including the use of higher forming forces and easier tolerances to maintain.

Figure 20:
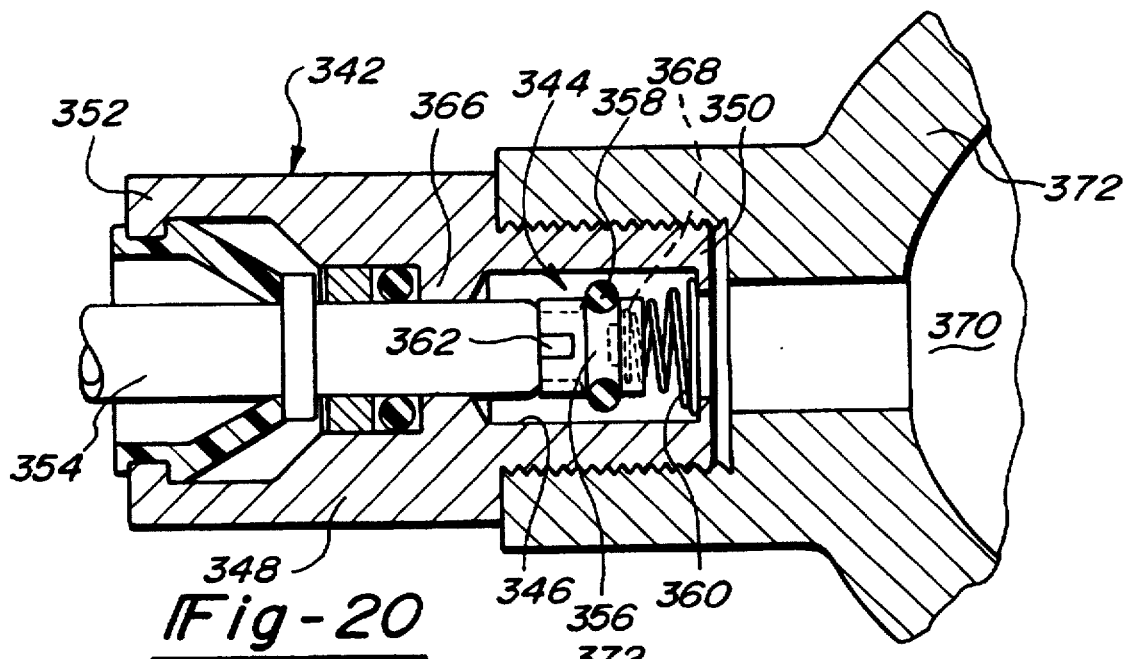
FIG. 20 is a side elevation view, partially in cross-section, of a connector assembly including a check valve unit and shown with the tubular conduit in its operative position within the axial bore of the housing.
Figure 21:
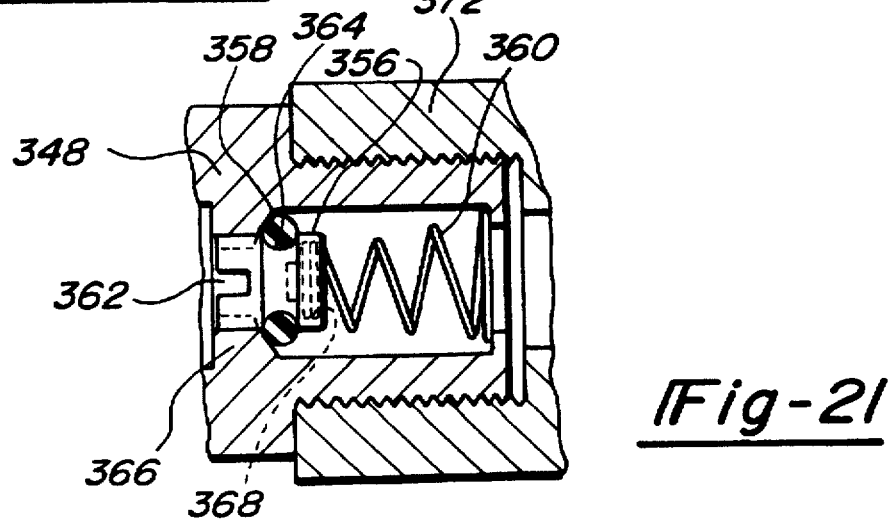
FIG. 21 is an enlarged side elevation view, partially in cross-section, of the connector assembly illustrated in FIG. 20, particularly showing the check valve unit when the tubular conduit is not in its operative position within the axial bore of the housing.

Referring to FIG. 20, a side elevation view of a connector assembly 342 is shown partially in cross-section. The connector assembly 342 features a check valve unit 344, which is disposed in an axial bore 346 of a housing 348. The check valve unit 344 operates to block the flow of fluid from a second end 350 of the housing 348 to a first end 352 of the housing when the conduit 354 is not in its operative position within the axial bore 346 of the housing. It should be noted that FIG. 20 illustrates the connector assembly with the conduit 354 in its operative position, while FIG. 21 illustrates an enlarged portion of the connector assembly where the conduit is not in its operative position. When the conduit 354 is in its operative position, the check valve unit 344 also operates to permit the flow of fluid between the first end 352 and the second end 350 of the housing 348. Before proceeding to describe the check valve unit 344, it may be worthy to note that it may be used with a variety of retainer elements, and the particular retainer element illustrated in FIG. 20 (similar to that of FIG. 13) is intended for exemplification only.

The check valve unit 344 generally comprises a valve body 356, an elastomeric ring 358, and a helical compression spring 360. The valve body 356 is formed with a plurality of generally axially extending, circumferentially spaced passageways or notches 362 for selectively permitting fluid to flow to or from the conduit 354 The elastomeric ring 358 is seated in an annular groove 364 of the valve body 356 such that when the conduit 354 is not in its operative position within the axial bore 346 of the housing 348, the elastomeric ring is in sealing engagement with a neck portion 366 of the housing. Accordingly, the elastomeric ring 358 is associated with the valve body 356 such that it is operative to block the flow of fluid from the second end 350 of the housing 348 through the passageways 362 in the valve body when the conduit 354 is not in its operative position within the axial bore 346 of the housing. The helical compression spring 360 is adapted to have one end seated in a circular groove 368 of the valve body and the other end in engagement with the housing 348 (generally at the second end 350 thereof). The spring 300 operates to resiliently urge the valve body 356 into a nesting relationship with the housing 348 (as shown in FIG. 21) when the conduit 354 is not in its operative position, thereby causing the elastomeric ring to block fluid flow. However, the spring 360 also operates to permit the valve body 356 to be displaced axially from the nesting relationship by yieldably resisting the insertion of the conduit into the axial bore 346 of the housing, thereby permitting fluid flow through the passageways 362 in the valve body when the conduit is in its operative position within the axial bore of the housing. It should be noted that the provision of the check valve unit 344 in connector assembly 342 will permit an area 370 in a device 372 to be charged with a fluid before the device is shipped in an application where the conduit 354 is to be connected after shipment of the device.

Figure 22:
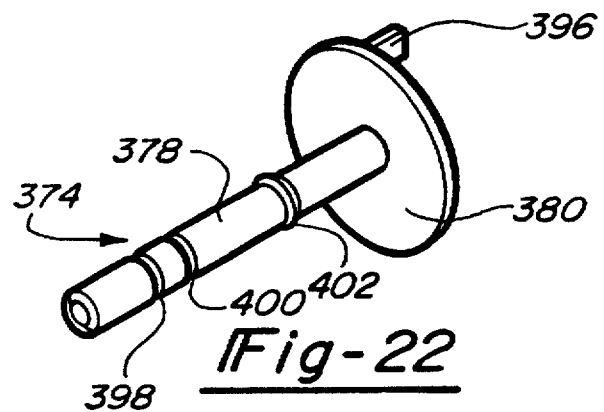
FIG. 22 is a perspective view of a stuffer-plug according to the present invention.

Referring to FIG. 22, a perspective view of a stuffer-plug 374 according to the present invention is shown. The stuffer-plug 374 is intended to be disposable and is preferably made from a plastic material. The stuffer-plug 374 servers three principal functions, which may best be illustrated with reference to FIG. 23. Briefly, the stuffer-plug 374 is used to install one or more sealing elements in the axial bore of a housing and detachably secure a retainer element to the housing. The stuffer-plug 374 also serves to seal the axial bore of the housing.

Figure 23:
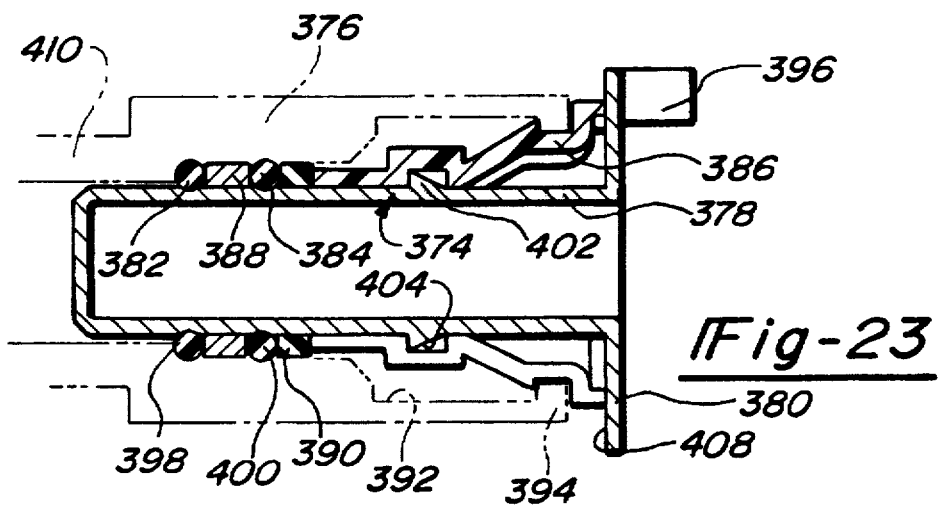
FIG. 23 is a side elevation view, partially in cross-section with the housing shown in phantom, of the stuffer-plug illustrated in FIG. 22 supporting the sealing and retainer elements.

FIG. 23 is a side elevation view of the stuffer-plug 374, partially in cross-section, shown to be disposed in a housing 376 (in phantom lines). The stuffer-plug 374 is comprised of a body which is formed with a rod-shaped portion 378 and a facing portion 380 extending generally from one end of the rod-shaped portion. The rod-shaped portion is adapted to support sealing elements 382 and 384, and a retainer element 386 in a generally coaxial assembly relationship thereon. The rod-shaped portion 378 may also be used to support a sleeve 388 and a bushing 390 in the appropriate application. The rod-shaped portion 378 is also adapted to be inserted into an axial bore 392 of the housing 376 and preferably has an outer diameter generally corresponding to that of the conduit to be connected to the housing. The rod-shaped portion may be either a solid rod or tubular in construction, provided that the tube is closed at some point in order to seal the axial bore 392.

The facing portion 380 of the stuffer-plug body is adapted to cover or substantially cover the axial bore 392 of the housing 376 at a first end 394 thereof. In one form of the present invention, the facing portion 380 is a circular plate extending generally transversely from the rod-shaped portion 378, and the facing portion is formed with a generally axially extending tab 396 for facilitating the removal of the stuffer-plug 374 from the axial bore 392 of the housing 372. The rod-shaped portion 378 is also formed with two annular grooves 398 and 400 which seat the elastomeric ring sealing elements 382 and 384 respectively. The annular grooves 398 and 400 provide positioning means for maintaining the sealing elements 382 and 384 and the retainer element 382 in the assembly relationship on the stuffer-plug body until the stuffer-plug body is removed from the axial bore 392 of the housing 376. The annular grooves 398 and 400 operate to prevent the sealing and retainer elements from slipping off the stuffer-plug body before the rod-shaped portion 378 is inserted into the axial bore 392 of the housing, and yet also permits the sealing and retainer elements to slide off the rod-shaped portion when the stuffer-plug body is removed from the housing. It should be noted that it may only be necessary to provide for one annular groove in the rod-shaped portion 378, or provide for one or more annular projections instead of the annular grooves in the appropriate application. The rod-shaped portion 378 may also include an annular projection 402 formed with an inclined surface 404 for cooperating with the retainer element 386 to prevent the retainer element from slipping off the stuffer-plug body before the rod-shaped portion is inserted into the axial bore of the housing. The inclined surface 404 operates to facilitate the removal of the stuffer-plug body from the axial bore 392 of the housing 376 by causing a gradual outward deflection of the retainer element leg members as the stuffer-plug body is pulled out of the axial bore until the inwardly opening channel portion 406 of the retainer element leg members clears the annular projection 402.

The sealing elements 382–384 and the retainer element 386 are preferably disposed on the rod-shaped portion 378 in the assembly relationship such that one end of the retainer element is positioned adjacent to the facing portion 380 and the sealing elements 382–384 are positioned adjacent to the opposite end of the retainer element. Accordingly, the facing portion 380 will provide a blocking surface 408 upon which the retainer element 386 is adapted to bear against when the stuffer-plug body is inserted into the axial bore 392 of the housing. Thus, when the rod-shaped portion 378 is inserted into the axial bore 392 of the housing 376, the sealing elements 382–384 and the retainer element 386 will be carried with the rod-shaped portion until the retainer element is detachably secured to the housing. It should be appreciated that once the rod-shaped portion 378 is in its operative position within the axial bore 392 of the housing (as shown in FIG. 23), the sealing elements 382–384 will operate to provide a fluid tight seal between confronting portions of the rod-shaped portion and the housing. In this position, the housing 376 or the device to which the housing is mounted is prepared for shipment and subsequent connection to a conduit. Additionally, in order to connect the conduit to the housing 376, the operator simply withdraws the stuffer-plug 374 from the housing and inserts the conduit in its place. Until that time, the stuffer-plug 374 will seal the axial bore 392 of the housing 376 from dirt or other environmental contamination.

It should be noted that with the sealing elements 382–384 and the retainer element 386 disposed on the rod-shaped portion of the stuffer-plug body in an assembled relationship, this combination of components forms a pre-assembled stuffer-plug unit for insertion into the axial bore of a housing. It may also be pointed out with reference to FIG. 23 that the housing 376 is not provided with eternal threads at the second end 410 thereof. This is to illustrate that the housing 376 may form part of an integral cast body, such as an engine block for example.

Figure 24:
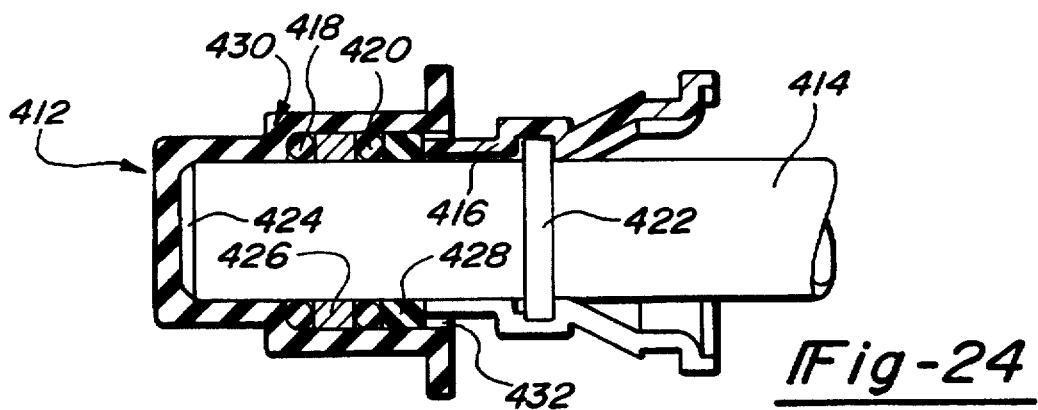
FIG. 24 is a side elevation view, partially in cross-section, of a pre-assembled connector conduit unit according to the present invention protected by a removable, disposable cover.

Referring to FIG. 24, a side elevation view of a preassembled connector conduit unit 412 is shown, partially in cross-section. The connector conduit unit 412 generally comprises a tubular conduit 414, a retainer element 416 and one or more sealing elements 418 and 420. The retainer element 416 is disposed on the conduit 414 in association with an annular projection 422 of the conduit such that the retainer element is fixed or substantially fixed from axial movement in relation to the conduit. The sealing elements 418–420 are disposed on the conduit 414 between an end 424 of the conduit to be connected and the retainer element 416. A sleeve 426 and a bushing 428 may also be disposed on the conduit (as illustrated) in the appropriate application. The connector conduit unit 412 is also shown to include a removable, disposable cover 430 adapted to encompass at least the end 424 of the conduit to be connected. In one form of the present invention, the cover 430 is constructed from an elastomeric material and is adapted to encompass the sealing elements 418–420 and a portion of the retainer element 416. The cover 430 serves to protect the end 424 of the conduit to be connected and the sealing elements 418–420 from dirt or other environmental contamination before the connector conduit unit 412 is inserted in the axial bore of a housing. The cover 430 should be resilient and flexible, and have an aperture 432 formed therein for permitting the cover body to pass over the end 424 of the conduit to be connected and the sealing elements 418–420. The cover 430 may be subsequently removed and disposed of when the conduit 414 is to be inserted into an axial bore of a housing. When the conduit 414 is inserted into an axial bore of a housing to unit the conduit to the housing, it should be noted that this one-step action will concomitantly install the sealing elements 418–420 in the axial bore of the housing and detachably secure the retainer element 416 to the housing.

Figure 25:
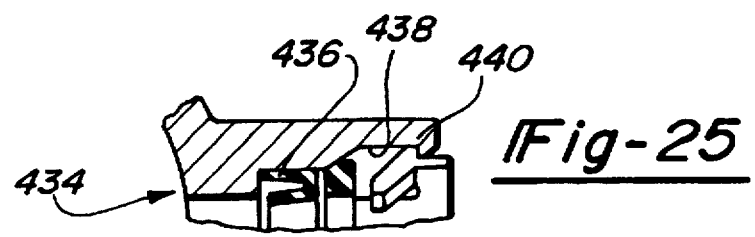
FIG. 25 is a fractional side elevation view, partially in cross-section, of a connector assembly employing a U-cup sealing element.

Referring to FIG. 25, a fractional side elevation view of a connector assembly 434, partially in cross-section, is shown. Connector assembly 434 features a resilient, flexible U-cup sealing element 436 disposed within an axial bore 438 of the connector housing 440. Accordingly, FIG. 25 serves to illustrate that various types of conventional sealing elements may be employed, including X-section and box-section sealing elements.

Figure 26:
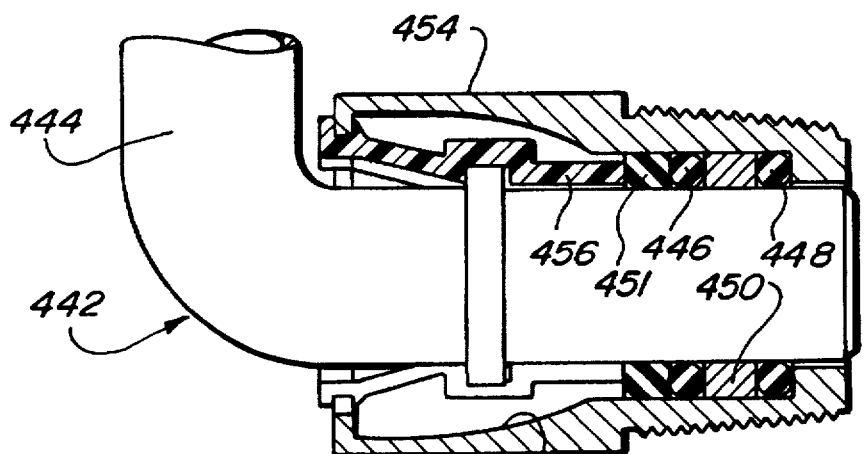
FIG. 26 is a side elevation view, partially in cross-section of an elbow connector assembly according to the present invention.

Referring to FIG. 26, a side elevation view of an elbow connector assembly 442 is shown, partially in cross-section. FIG. 26 serves to illustrate that a bend (approximately 90 degrees) in a tubular conduit 444 will permit a connector assembly as previously described to form an elbow connector assembly and eliminate the need for a separate elbow connector. FIG. 26 also serves to illustrate that without the conduit 444, the remaining components of the connector assembly 442 provide a pre-assembled connector conduit unit. In other words, with the sealing elements 446–448, the sleeve 450 and the bushing 451 disposed in the axial bore 452 of the connector housing 454, and the retainer element 456 detachably secured to the housing, then the conduit 444 may be united to the housing in a one-step snapping connection. FIG. 26 further serves to illustrate that the axial bore 452 of the housing 454 may be sloped in the appropriate application.

Figure 28:
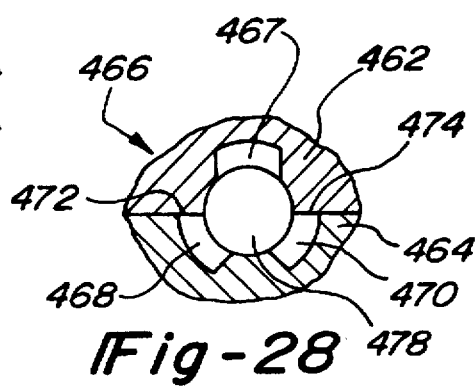
FIG. 28 is a fractional front elevation view of the manufacturing apparatus illustrated in FIG. 27.
Figure 27:
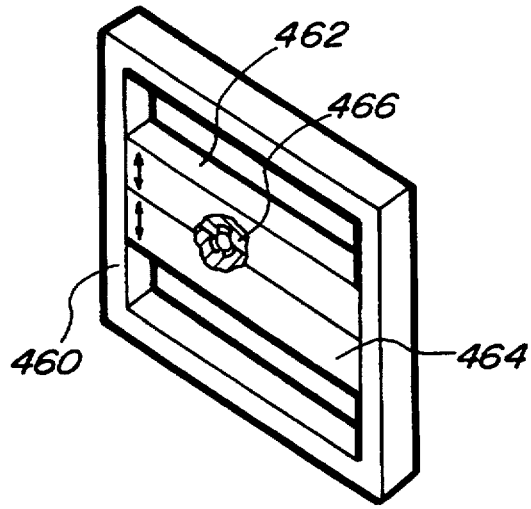
FIG. 27 is a perspective view, partially in cross-section, of an apparatus for manufacturing the retainer element illustrated in FIGS. 17 and 18.

Referring to FIG. 27, a perspective view of an apparatus 458 for manufacturing the retainer elements of the type illustrated in FIGS. 15–18, 23–24 and 26 is shown. The apparatus 458 has been simplified for illustrative purposes, and includes a frame structure 460 and a pair of vertically movable opposing dies 462 and 464. The apparatus is an injection molding machine for manufacturing a plurality of plastic retainer elements simultaneously. FIG. 28 is a fractional front elevation view, partially in cross-section, of a portion 466 of the apparatus 458. FIG. 28 particularly illustrates the relationship of the dies 462–464 to the leg members 467, 468 and 470 of one of the retainer elements being molded. It is important to note that the edge 472 of leg member 468 and the edge 474 of leg member 470 are formed along the junction of dies 462 and 464. This feature or particular design of the retainer element permits the use of a two-die injection molding apparatus instead of a three-die injection molding apparatus, and consequently allows several retainer elements to be molded at the same time in one apparatus. It should be noted that the shape or angle of the other edges of the retainer element leg members and the separation between the leg members is a matter of design choice, so long as two of the leg members may be formed within a single die and the leg members will not be locked into the dies after they are formed.

Figure 29:
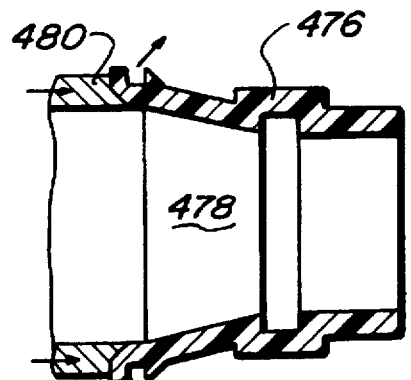
FIG. 29 is a side elevation view, partially in cross-section, of a core body and ejector forming part of the apparatus of FIG. 27.

As may be best illustrated with reference to FIG. 29, the retainer element 476 is molded around a core body 478 which is inserted into a suitable cavity between the dies 462 and 464. The core body 478 has a shape which conforms to the desired interior shape and dimensions of the retainer element 476, while the cavities of the dies 462 and 464 have a shape which corresponds to the desired exterior shape and dimensions of the retainer element. After the plastic has been injected and sufficiently hardened, the dies 462 and 464 open and an ejector member 480 of the apparatus is translated axially in the direction of the arrows to urge the outward deflection of the leg members 467–470, such that the retainer element 476 may be readily removed from the apparatus 458.

Figure 30:
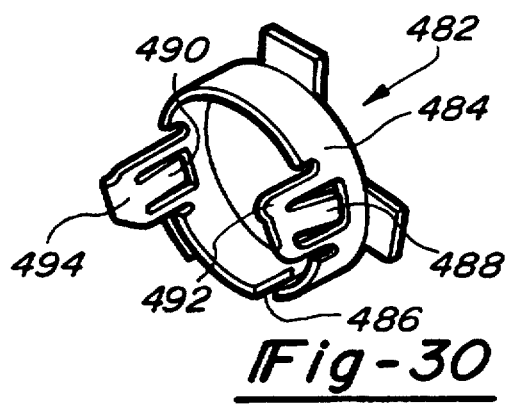
FIG. 30 is a perspective view of another embodiment of a retainer element.

Referring to FIG. 30, a perspective view of another retainer element 482 is shown. In the embodiment illustrated, retainer element 482 is preferably manufactured from a metal material. The retainer element 482 features a split ring body 484, having an opening or slot 486 for facilitating the removal of the retainer element after it has been attached to a housing. The retainer element 482 also features a pair of spring tabs 488 and 490 extending from one end of the opposing jaw members 492 and 494 respectively.

Figure 31:
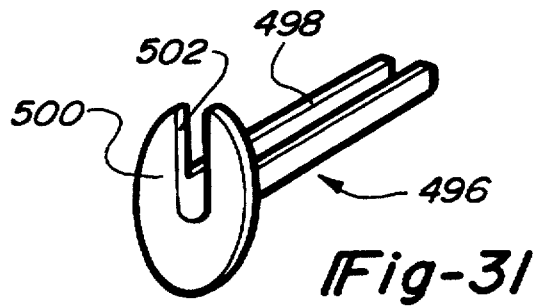
FIG. 31 is a perspective view of a tool which may be used to assist the disconnection of the tubular conduit from the connector housing.

Referring to FIG. 31, a perspective view of a tool 496 is shown which may be used to assist the disconnection of a tubular conduit from a connector housing. The tool 496 comprises a body having a trough-shaped portion 498 and a generally circular-shaped gripping portion 500. The trough-shaped portion 498 is adapted to wrap around or overlie a conduit, and it preferably has a thickness corresponding to the radial height of the annular projection for the conduit.

The gripping portion 500 includes a suitable aperture 502 to permit the trough-shaped portion 498 to come into generally continuous engagement with the conduit along its length. It should be noted that the shape of the gripping portion 500 need not be circular, but may be varied provided a sufficient surface is available upon which the necessary axial force may be brought to bear on the trough-shaped section in order to urge the outward deflection of the retainer element leg members or jaws to the point where the conduit may be readily withdrawn from the axial bore of the housing. It should also be appreciated that the cross-sectional span of the trough-shaped portion 498 should be sufficiently circular to engage all of the retainer element leg members or jaws, and yet also permit the trough-shaped portion to be fitted over the conduit. It may also be noted that other tools may be developed for releasing the conduit and/or the retainer element from the housing, such as triangular-acting pliers which engage the retainer element leg members at the finger portions and cause them to be deflected inwardly sufficiently to detach the retainer element from the housing.

Referring to FIG. 32, a side elevation view of another connector assembly 504 is shown, partially in cross-section. The connector assembly 504 features a retainer element 506 which is similar to the retainer element 316 of FIGS. 17 and 18. In FIG. 32, the retainer element 506 is shown in its operative position generally within the axial bore 508 of the connector housing 510. However, retainer element 506 is also adapted to be disposed in a partially installed position, as illustrated in FIG. 33. In the partially installed position, the retainer element 506 will engage the annular lip 512 of the housing between the inwardly opening channel portion 514 and the outwardly opening channel portion 516 of the retainer element. Accordingly, it should be appreciated that this engagement will operate to maintain the retainer element 506 in this position until the conduit 518 is to be inserted into the axial bore 508 of the housing 510. It should be noted that as the conduit is inserted into the axial bore 508 of the housing 510, the annular projection 520 passes freely into the inwardly opening channel portion 514, and the operator should be able to visually observe that the annular projection 520 of the conduit has been received into the inwardly opening channel portions 514 of the retainer element leg members. Upon the further insertion of the conduit 518 into the axial bore 508 of the housing 510, the retainer element 506 will be carried with the conduit until the annular lip 512 of the housing snaps into the outwardly opening channel portions of the retainer element leg members. Although each of the leg members of the retainer element 506 is provided with a finger portion 522 extending out of the axial bore 508, this feature of the retainer element may be deleted such that once the conduit 518 is in its operative position within the axial bore the retainer element will be flush with the first end 524 of the housing and the retainer element will not be visible from the side of the connector assembly. Accordingly, this modification of the retainer element 506 will provide the operator with a visible indication that the conduit is in its operative position and the assembly is complete.

The connector assembly 504 is also provided with a filter or screen 525 which serves to filter particulate matter from the fluid flowing through the bore of the connector assembly. The filter 525 is disposed in a reduced diameter portion 526 of the bore 508, and is adapted to be interposed between the end of the conduit 518 to be connected and shoulder 527 of the housing 510. The filter 525 may be made from any suitable material, such as metal wire or plastic mesh. It should be understood that the provision of the filter 525 is not limited to the connector assembly 504, and the filter may be employed in other suitable connector housings.

FIGS. 34, 35 and 36 illustrate a connector assembly 528 according to the present invention. The connector assembly 528 is adapted to convey fluid and is comprised of a tubular connector housing 530 and a plug tubular conduit 532 having a forward end portion that is matable with the connector housing. The tubular conduit 532 is as described above and includes an outwardly projecting annular shoulder 534 and a forward end 536 in fluid communication with fluid passed through the connector housing.

The connector housing 530 includes a tubular adapter sleeve 538 having an interior bore 540 extending between forward and rearward axial ends 542 and 544, a retaining element 546 adjacent to the forward axial end 542, a stepped tubular conduit 548 adjacent to the rearward axial end 544, and a bushing 550 and elastomeric seal 552 disposed in the tubular conduit 548. The adapter sleeve 538 is provided with rectangular openings (or apertures) 554 at a location adjacent to the forward axial end 542 and a pair of radial flanges 556 and 558, the flanges being axially spaced and forming a retention cavity. In the embodiment shown, each radial flange 556 and 558 extends radially inwardly with the flange 556 being disposed interiorly of the bore 540 to divide the bore into first and second sections and the flange 558 being disposed adjacent to the rearward axial end 544. The retaining element 546 has outwardly extending portions 560 received in the respective openings 554 by which the retaining element is detachably secured to the adapter sleeve 538 and inwardly extending legs 562 which seat against the annular shoulder 534 to retain the tubular conduit 532 in the connector housing.

The stepped tubular conduit 548 includes an enlarged diameter section 564 having at its forward mating end a radial flange 566 that extends radially outwardly, a reduced diameter section 568 and a transition shoulder 570 forming a step between the two conduit sections 564 and 568. The enlarged diameter section 564 is adapted to be located in the annular retention cavity formed between the radial flanges 556 and 558 and forms a socket for receiving the forward end portion 536 of the plug tubular conduit 532. It should be noted that the stepped tubular conduit 548 may be a sleeve which is conventionally connector to a tubular conduit. Further, the adapter sleeve 538 and the stepped tubular conduit 548 may be made from metal or plastic, and the rearward axial end 544 of the adapter sleeve 538 may be configured to be either snap fit or threaded over the enlarged diameter section 564 of the stepped tubular conduit 548. The outwardly extending radial flange 566 and the transition shoulder 570 of the stepped tubular conduit 548 cooperate with the inwardly extending radial flanges 556 and 558 of the adapter sleeve 548 to locate and retain the enlarged diameter section 564 in the retention cavity. As described hereinabove the bushing 550 and the elastomeric sealing member 552 are disposed in the enlarged diameter section 564 whereby the form a fluid tight seal between the inner wall of the expanded diameter section 564 and the outer periphery of the plug tubular conduit 532.

Referring to FIG. 37, a perspective view of a connector housing 576 with an integral locking means is shown, partially in cross-section. The retaining means is provided by a pair of opposing, inwardly converging jaw members 578 and 580. The jaw members 578 and 580 may be formed concomitantly with the connector housing 576 in the same molding process or they may be fixedly secured or otherwise attached to the connector housing 576 such as by a suitable adhesive. The converging ends 582 and 584 of the jaw members 578 and 580, respectively, are shaped to conform to the outer diameter of the conduit to be connected to the connector housing 576. In one form of the invention, the diverging ends 586 and 588 of the jaw members 578 and 580, respectively, extend radially beyond the outer diameter of the housing 576. However, it should be understood that the shape and number of the leg members may be varied in the appropriate application. It should also be noted that the housing 576 is also formed with at least one, generally axially extending recess 590 for facilitating flexing of the housing and jaw members.

FIGS. 38 through 47 relate to a swivelable quick connect assembly for use with tubular conduits according to a further embodiment of the present invention. In general, the quick connect assembly disclosed in these figures comprises a housing having an axial bore for receiving one end of the conduit, an elastomeric ring-like seal disposed in the bore for providing a fluid tight seal between confronting portions of the conduit and the housing, an annular bushing is disposed in the bore for positioning the seal and for guiding the one end of the conduit into nesting relationship with the bore, and a retainer detachably secured to the housing and cooperable with an annular projection on the conduit for securing the conduit in its operative position within the bore.

Figure 38:
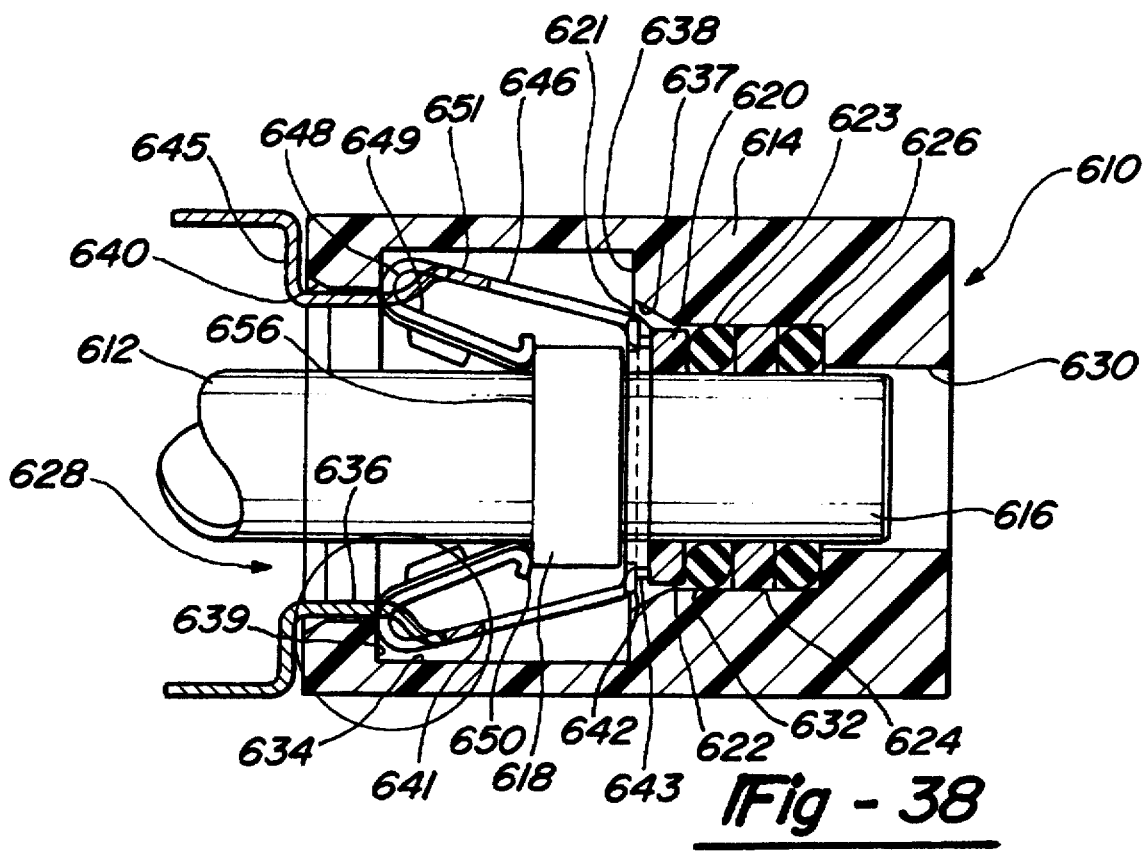
FIG. 38 is a side elevation view, partially in cross-section, of yet another alternate embodiment of a connector assembly having a retainer element according to the present invention.

With respect to the figures, and particularly referring to FIG. 38, a side elevation view, partially in cross section of the alternate embodiment of a connector assembly of the present invention is shown and is generally illustrated as 610. The connector assembly 610 includes a male conduit 612 and a female housing 614. The male conduit 612 includes an end 616 having a finished surface as appropriate to form a fluid-tight seal with fluid seals as discussed below. Adjacent the end 616 is a conduit flange 618 that operates to secure the conduit 612 within the female housing 614.

A tubular flanged collar 620 having a first side 621 and a second side 622 is fitted to the conduit 612. Adjacent the collar 620 is a first seal 623, an annular bushing 624, and a second seal 626. The first and second seals 623 and 626 respectively are preferably O-ring type seals composed of an elastomeric, fluid-seal providing material. The annular bushing 624 functions to both position of the seals 623 and 626 and to guide the end 616 into nesting relationship within the female member 614. Those skilled in the art will understand that arrangement of the seals and the bushing as set forth is not intended to be limiting but may well be modified to meet the particular needs of each connector.

The female housing 614 includes a throughbore 628 into which the male conduit 612 is selectively fitted. The throughbore 628 is subdivided into distinct regions including a first bore 630 which receives the most distal portion of the end 616 of the conduit 612, a second bore 632 into which the seals 623 and 626 and the bushing 624 as well as a portion of the collar 620 are fitted, a third bore 634, and a fourth bore 636. Adjacent the second bore 632 is a chamfered lead-in portion 637. The lead-in portion 637 is formed to provide an area that is gradually reduced in diameter toward the second bore 632. As such, the overall diameters of the seals 623 and 626 are reduced by the lead-in portion 637 upon insertion of the conduit 612 into the housing 614.

Between the lead-in portion 637 and the third bore 634 is formed a radial wall 638 against which acts as an inward stop for the retainer 641 of FIG. 38. This relationship prevents excessive insertion of the male conduit 612 into the female housing 614.

A radial wall 639 is formed between the third bore 634 and the fourth bore 636. The radial wall 639 functions in engagement of the male conduit 612 in the female housing 614, as will be described below. A lead-in chamfer 640 is formed at the outermost end of the female housing 614.

FIG. 41 illustrates a side view of the operative retaining element of the present invention. With reference then to both FIGS. 38 and 41, a resilient retainer element 641 is shown in position between the male conduit 612 and the female housing 614 in FIG. 38 and in isolation in FIG. 41. In the embodiment illustrated in these figures, the retainer element 641 is preferably a one-piece construction that is manufactured from a metallic material. The retainer element 641 includes a collar 642, a body element 643, at least one or more deflectable fingers 645, and at least one or more legs 646.

The collar 642 is positioned adjacent the wall 621 of the collar 620 and has an aperture 644 (shown in FIGS. 39, 40, 42, and 43) for providing passage of the conduit 612 through the retainer element 641. Each of the legs 646 projects from the body element 643 and bends at an arc at area 648 forming a backstop for locking engagement with the radial wall 639. The arcuate area 648, in turn, connects a retaining portion 649 which bends, partially doubling back on itself, forming a flange 650. When the male conduit 612 is locked into position in the female housing 614, the flange 650 resiliently engages a surface 656 formed on the conduit flange 618 of the male conduit.

As now may be clearly understood, The lead-in chamfer 640 serves to lead in the retainer 641 whereby the retainer 641 is structured such that upon insertion of the male conduit 612 into the female housing 614, the legs 646 are reduced by the chamfer 640 as the retainer 641 is squeezed toward the control axis of the conduit 612. A cut out area 647 is shown between adjacent legs 646 to define the legs 646 as springs that must bend in response to the entry of the male conduit 612 (and male conduit flange 618 into female 614) sufficiently to reduce the bending force on area 648 and prevent the breaking away of retaining portion 649 from the legs 646.

As noted, the backstop 648 abuts against the radial wall 639 for securing the retainer element 641 in the housing 614. Simultaneously, and in the engaged position, the flange 650 biases on the conduit flange 618 securing the conduit 612 in the retainer element 641.

Figure 39:
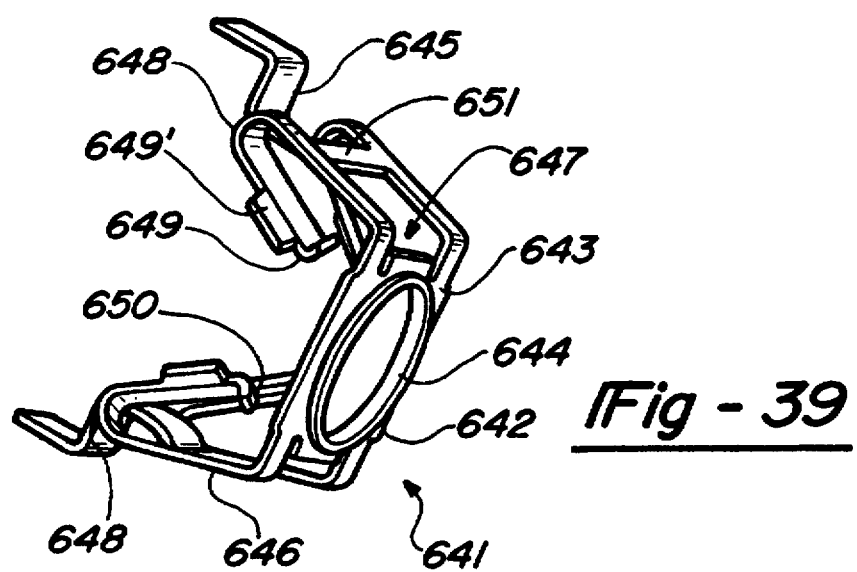
FIG. 39 is a perspective view of the retainer element of FIG. 38 shown in isolation.

Referring to FIGS. 39 and 43, perspective views of the retainer element 641 are illustrated. In FIG. 38 the retainer element 641 is shown in its entirety, while in FIG. 43 it is only partially shown. As illustrated, a member 651 interconnects a pair of substantially parallel legs 646. The fingers 645 project from the legs 646. The fingers 645 provide a means for grasping and removing the retainer element 641 from the female housing 614. The fingers 645 are generally bent in accordance with conventional sheet metal practice. While a single finger 645 is illustrated for each substantially parallel pair of legs 646, it is possible that each leg 646 would have its own finger.

FIG. 40 is an end view of the retainer element 641 and illustrates the position of the collar 642 with respect to the body 643, one of the legs 646, and the fingers 645. This view also illustrates the inwardly-facing position of the retaining portion 649 and the position of the flanges 650 with respect to the aperture 644.

FIG. 42 is an expanded plan view showing approximately half of the retainer element 651 prior to its being bent into the shape illustrated in the other figures. As noted, the retainer element 641 is preferably formed from a metallic material, and the form illustrated in FIG. 42 shows how the element 641 appears after stamping but before being selectively bent to assume the functional retainer shape shown in the other figures.

FIG. 44 is a close-up, detailed side elevational view in partial cross section of a portion of the retainer element 641 in its locking and engaged position between the male conduit 612 and the female housing 614. This detailed view more clearly discloses the advantages of the present design over known retainers.

Specifically, the present design provides at least two significant advantages over the prior art. One advantage represents an improvement in wear characteristics, while the other advantage represents an improvement in locking characteristics.

With respect to the first advantage, the sharply bent connection between the outer leg (part of the leg 646 in the illustrated invention) and the inner leg (retaining portion 649 in the illustrated invention). During formation, the sharp bending of the metal 648 connecting the inner and outer legs stresses the material such that the integrity of the metal defining the bend itself is significantly compromised. This is particularly a problem on repeated insertion and removal of the male conduit and the female housing, where such repeated use often results in fracturing of the metal at the bend 648, and subsequent failure of the connection.

The illustrated design of the present invention overcomes this difficulty by minimally stressing the metal at the bend that defines the arcuate area 648. Because the design represents a gently curving bend 648, and because of the spring arms 646, the stress is reduced on the narrow area of the metal form, and the stress is equally distributed over a wide area, thus minimizing the likelihood of fracture after repeated connection and disconnection.

With respect to the second advantage, the force on the expanded diameter 618 of the male conduit 612 is also better distributed by the ends 650 of retainer legs 649. Shown in FIG. 41 are stiffeners 649' for the retainer arms 649. The stiffeners 649' are shown only part way on the straight section of arms 649, but they may be over the full extent of arms 649 between where the bending takes place for areas 650 and 648.

FIG. 45 illustrates a bend (generally illustrated as 670) between an inner leg 672 and an outer leg 674 that is typical of the prior art. The outer leg 674 is stiff and the inner leg 672 combines the required bending and the resistance to pull-out of the male from the female. Constructions such as this cannot have the resistance to pull apart that the stiffer construction that elements 649 and 649' confer to the retainer 641.

Figure 46:
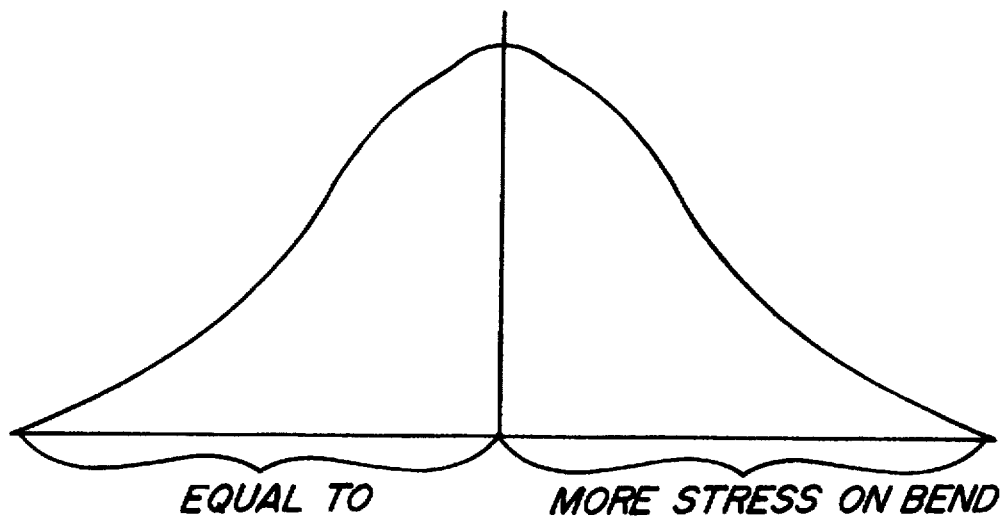
FIG. 46 is a Gauss curve demonstrating an ideal force transfer versus characteristic undesirable prior art force transfers.
Figure 47:
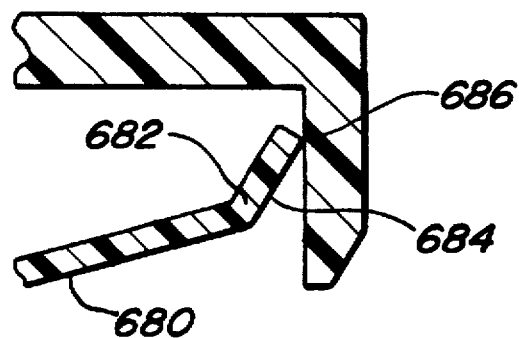
FIG. 47 is a partial view of an additional prior art connector retaining element shown in relation with a female housing.

FIG. 46 shows a Gauss curve that represents the fit and tolerances to be expected when a retainer is constructed as shown in FIG. 47. In FIG. 47, the retainer arm 680 has a bend 682 that is between arm 680 and pad 84. FIG. 47 is drawn in a position where the tip 686 of the pad 684 is passing the forces that would separate the male conduit from the female housing. This corresponds to the left half of the Gauss curve of FIG. 46. There is a lever arm, the distance down tab 684 from tip 686 to bend 682, that increases the bending force on area 682 as a result of the force that is being transmitted to the female housing by the tip of the pad 686. This means that in FIG. 46, those tolerance situations on the left side of the Gauss curve are a worse force on bend 682, and tolerances that cause the force transmitted from arm 680 to be transmitted to the female housing by the bend 682 are as good as the embodiment of retainer 641 that is shown, all things being equal (and they can be equal).

Accordingly, FIG. 47 type construction with the pads can only be as good only 50 percent of the time.

While the above description constitutes the preferred embodiments of the present invention, it will be appreciated that the invention is susceptible to modification, variation and change without departing from the proper scope and fair meaning of the accompanying claims.

I claim:

1. A swivelable quick-connect coupling for connecting a tube end and a fluid passage for conducting fluids between the tube and the passage, the coupling comprising:

an outwardly-projecting annular enlargement provided at a distance from the tube end, said enlargement having an outwardly-facing blocking wall portion formed thereon;

a coupling housing fluidly associated with the fluid passage, said coupling housing having a first end, said coupling housing further having formed therein a bore for at least partially receiving the tube end, said bore having a first portion with a relatively large diameter, said first portion being adjacent said first end of said housing, a second portion with a relatively small diameter, and a third portion located between said first portion and said second portion and having a diameter smaller than the diameter of said first portion and larger than the diameter of said second portion, said coupling housing further including an inwardly-extending flange having an inner wall;

a retainer element including a pair of opposing and radially displaceable members and a pair of opposing manually engageable and radially deformable elements, said radially displaceable members having formed thereon an inner radial wall and an outer radial wall, said inner radial wall being cooperable with said outwardly-facing blocking wall portion of the tube end and said outer radial wall being cooperable with said inner wall of said inwardly-extending flange for releasably securing the tube end within the coupling whereby the tube end is in fluid communication with the fluid passage; and interconnecting portions disposed around the outer surface of the tube end and integrally connected between said displaceable members and said deformable elements such that radially inwardly compressive movement of said deformable elements enables radially outward movement of said displaceable members which in turn causes said radially inner walls on said displaceable members to move radially out of engagement with said blocking wall portion on the tube end, whereby the tube end may be withdrawn from said housing.

2. The swivelable quick-connect coupling of claim 1, wherein said coupling housing is made of a plastic.

3. The swivelable quick-connect coupling of claim 1, wherein said retainer element is made of a resilient material.

4. The swivelable quick-connect coupling of claim 3, wherein said resilient material is a plastic.

5. The swivelable quick-connect coupling of claim 1, wherein said coupling housing includes means for removable attachment to the fluid passage.

6. The swivelable quick-connect coupling of claim 5, wherein said means for removable attachment is defined by a series of ribs formed on said coupling housing.

7. The swivelable quick-connect coupling of claim 1, including an elastomeric ring located within said bore to form a seal between the tube end and said coupling housing.

8. The swivelable quick-connect coupling of claim 1, wherein the tube end includes an outer diameter and wherein said displaceable members include converging ends which substantially correspond to said outer diameter of the tube end.

9. The swivelable quick-connect coupling of claim 1, wherein said retainer element is coupled to said housing to form a housing assembly and the tube end is insertable through said retainer element for connection to said housing assembly.

10. The swivelable quick-connect coupling of claim 9, wherein said retainer element is retained substantially within said coupling housing through cooperation between said outer radial wall and said inner wall of said inwardly-extending flange.

11. The swivelable quick-connect coupling of claim 1, wherein said displaceable members are forced to move apart upon insertion of the tube end through said retainer element into said housing.

12. The swivelable quick-connect coupling of claim 1, wherein said retainer element further includes a flexible portion connecting said deformable elements and said displaceable members.

13. The swivelable quick-connect coupling of claim 1, wherein said inner wall of said inwardly-extending flange defines a substantially flat surface.

14. The swivelable quick-connect coupling of claim 1, wherein said displaceable members and said deformable elements are connected by recessed regions.

15. The swivelable quick-connect coupling of claim 14, wherein said recessed regions cooperate with said housing to maintain the position of said retainer element within said housing.

16. The swivelable quick-connect coupling of claim 1, wherein each of said deformable elements includes an outer surface upon which pressure is applied for effecting compressive movement.

17. The swivelable quick-connect coupling of claim 1, wherein said annular enlargement includes an inwardly-facing blocking wall portion and said bore of said housing includes an interior radial wall, said inwardly-facing blocking wall portion and said interior radial wall being cooperable upon insertion of the tube end into said housing.

18. The swivelable quick-connect coupling of claim 1, wherein said retainer element is of one-piece construction.

19. The swivelable quick-connect coupling of claim 1, wherein said deformable elements and said displaceable members are interconnected by resilient members to define an array in which said deformable elements are substantially equally spaced apart and said displaceable members are substantially equally spaced apart.

20. The swivelable quick-connect coupling of claim 1, wherein said retainer element includes a central, tube-passing aperture.

21. The swivelable quick-connect coupling of claim 1, wherein said retainer element is substantially centrally positionable within said coupling housing.

22. A swivelable quick-connect coupling for connecting a tube end and a fluid passage for conducting fluids between the tube and the passage, the coupling comprising:

an outwardly-projecting annular enlargement provided at a distance from the tube end, said enlargement having an outwardly-facing blocking wall portion formed thereon;

a coupling housing fluidly associated with the fluid passage, said coupling housing having formed therein a bore for at least partially receiving the tube end;

a retainer element including a pair of opposing and radially displaceable members and a pair of opposing manually engageable and radially deformable elements, said radially displaceable members having formed thereon an inner radial wall and an outer radial wall, said inner radial wall being cooperable with said outwardly-facing blocking wall portion of the tube end and said outer radial wall being cooperable with said coupling housing for releasably securing the tube end within the coupling housing whereby the tube end is in fluid communication with the fluid passage; and interconnecting portions disposed around the outer surface of the tube end and integrally connected between said displaceable members and said deformable elements such that radially inwardly compressive movement of said deformable elements enables radially outward movement of said displaceable members which in turn causes said radially inner walls on said displaceable members to move radially out of engagement with said blocking wall portion on the tube end, whereby the tube end may be withdrawn from said coupling housing.

* * * * *